United States Patent
Kajiwara et al.

(10) Patent No.: US 7,822,282 B2
(45) Date of Patent: Oct. 26, 2010

(54) MOVING IMAGE CODING APPARATUS, MOVING IMAGE DECODING APPARATUS, CONTROL METHOD THEREFOR, COMPUTER PROGRAM, AND COMPUTER-READABLE STORAGE MEDIUM

(75) Inventors: Hiroshi Kajiwara, Tokyo (JP); Mitsuru Maeda, Tokyo (JP); Masaki Suzuki, Saitama-ken (JP); Hiroki Kishi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1056 days.

(21) Appl. No.: 10/587,900

(22) PCT Filed: Mar. 11, 2005

(86) PCT No.: PCT/JP2005/004851

§ 371 (c)(1),
(2), (4) Date: Jul. 28, 2006

(87) PCT Pub. No.: WO2005/088977

PCT Pub. Date: Sep. 22, 2005

(65) Prior Publication Data
US 2007/0160299 A1 Jul. 12, 2007

(30) Foreign Application Priority Data
Mar. 12, 2004 (JP) .............................. 2004-071400
Jan. 20, 2005 (JP) .............................. 2005-013032

(51) Int. Cl.
*G06K 9/46* (2006.01)

(52) U.S. Cl. ........................................ 382/240; 341/79

(58) Field of Classification Search ................. 382/232, 382/240; 341/79
See application file for complete search history.

(56) References Cited

U.S. PATENT DOCUMENTS 4,974,071 A 11/1990 Maeda ......................... 358/80

(Continued)

FOREIGN PATENT DOCUMENTS

EP 763944 A2 3/1997

(Continued)

OTHER PUBLICATIONS

"Latest MPEG Textbook", ASCII Publishing, pp. 74-76, 1994, (published before this application Jul. 28, 2006).

*Primary Examiner*—Vikkram Bali
*Assistant Examiner*—Eueng-Nan Yeh
(74) *Attorney, Agent, or Firm*—Fitzpatrick, Cella, Harper & Scinto

(57) ABSTRACT

This technique prevents errors from being gradually accumulated on the decoding side, while maintaining high scalability, even when transformation to subbands as a plurality of frequency components is used for moving image coding. The image data of one input frame is decomposed into a plurality of subbands having different frequency components by a discrete wavelet transformation unit. A lower bitplane coding unit codes, for each bitplane, predetermined lower bits of each coefficient data of a subband LL and the coefficient data of subbands other than the subband LL. The data of the upper bits of the subband LL is stored in a frame memory. A motion vector detection unit detects a predicted value and motion vector on the basis of the decoded data of the subband LL in a preceding frame. A subtracter obtains the difference between the detected predicted value and the current frame.

10 Claims, 25 Drawing Sheets

U.S. PATENT DOCUMENTS

| | | | |
|---|---|---|---|
| 5,359,438 A | 10/1994 | Maeda | 358/539 |
| 5,371,606 A | 12/1994 | Katayama et al. | 358/400 |
| 5,450,209 A * | 9/1995 | Niimura et al. | 386/111 |
| 5,521,717 A | 5/1996 | Maeda | 358/426 |
| 5,933,249 A | 8/1999 | Shimura et al. | 358/429 |
| 5,982,435 A | 11/1999 | Tong et al. | 348/398 |
| 6,067,382 A | 5/2000 | Maeda | 382/239 |
| 6,169,821 B1 | 1/2001 | Fukunaga et al. | 382/239 |
| 6,205,252 B1 * | 3/2001 | Nguyen et al. | 382/234 |
| 6,272,180 B1 | 8/2001 | Lei | 375/240.16 |
| 6,282,240 B1 | 8/2001 | Fukunaga et al. | 375/240.01 |
| 6,307,886 B1 | 10/2001 | Westermann | 375/240.9 |
| 6,351,491 B1 * | 2/2002 | Lee et al. | 375/240.03 |
| 6,396,955 B1 | 5/2002 | Abe | 382/232 |
| 6,480,547 B1 | 11/2002 | Chen et al. | 375/240.27 |
| 6,486,981 B1 | 11/2002 | Shimura et al. | 358/500 |
| 6,512,793 B1 | 1/2003 | Maeda | 375/240.08 |
| 6,643,382 B1 | 11/2003 | Maeda | 382/100 |
| 6,697,521 B2 | 2/2004 | Islam et al. | 382/166 |
| 6,763,071 B1 | 7/2004 | Maeda et al. | 375/240.25 |
| 6,798,977 B2 | 9/2004 | Maeda | 386/111 |
| 6,956,972 B2 | 10/2005 | Wu et al. | 382/238 |
| 6,968,088 B2 | 11/2005 | Maeda et al. | 382/239 |
| 7,042,944 B2 | 5/2006 | van der Schaar et al. | 375/240.1 |
| 7,162,101 B2 | 1/2007 | Itokawa et al. | 382/282 |
| 2001/0033620 A1 * | 10/2001 | Itokawa | 375/240.28 |
| 2002/0018598 A1 * | 2/2002 | Maeda et al. | 382/239 |
| 2002/0031182 A1 | 3/2002 | Kishi | 375/240.19 |
| 2002/0154823 A1 | 10/2002 | Okada | 382/233 |
| 2005/0013365 A1 | 1/2005 | Mukerjee et al. | 375/240.16 |
| 2006/0013304 A1 | 1/2006 | Maeda et al. | 375/240.11 |
| 2007/0098073 A1 | 5/2007 | Maeda | 375/240.16 |
| 2007/0110158 A1 | 5/2007 | Maeda | 375/240.16 |
| 2007/0160299 A1 | 7/2007 | Kajiwara et al. | 382/240 |

FOREIGN PATENT DOCUMENTS

| | | |
|---|---|---|
| EP | 763944 A3 | 3/1999 |
| EP | 1 233 625 A2 | 8/2002 |
| GB | 2318244 A | 4/1998 |
| JP | 02-309777 | 12/1990 |
| JP | 03-006187 | 1/1991 |
| JP | 04-207280 | 7/1992 |
| JP | 05-191800 | 7/1993 |
| JP | 07-095571 | 4/1995 |
| JP | 09-149421 | 6/1997 |
| JP | 10-023411 | 1/1998 |
| JP | 10-126794 | 5/1998 |
| JP | 11-275585 | 10/1999 |
| JP | 2000-013797 | 1/2000 |
| JP | 2000-125304 | 4/2000 |
| JP | 2001-112004 | 4/2001 |
| JP | 2002-034043 | 1/2002 |
| JP | 2002-325257 | 11/2002 |
| JP | 2003-115765 | 4/2003 |
| JP | 2004-056632 | 2/2004 |

* cited by examiner

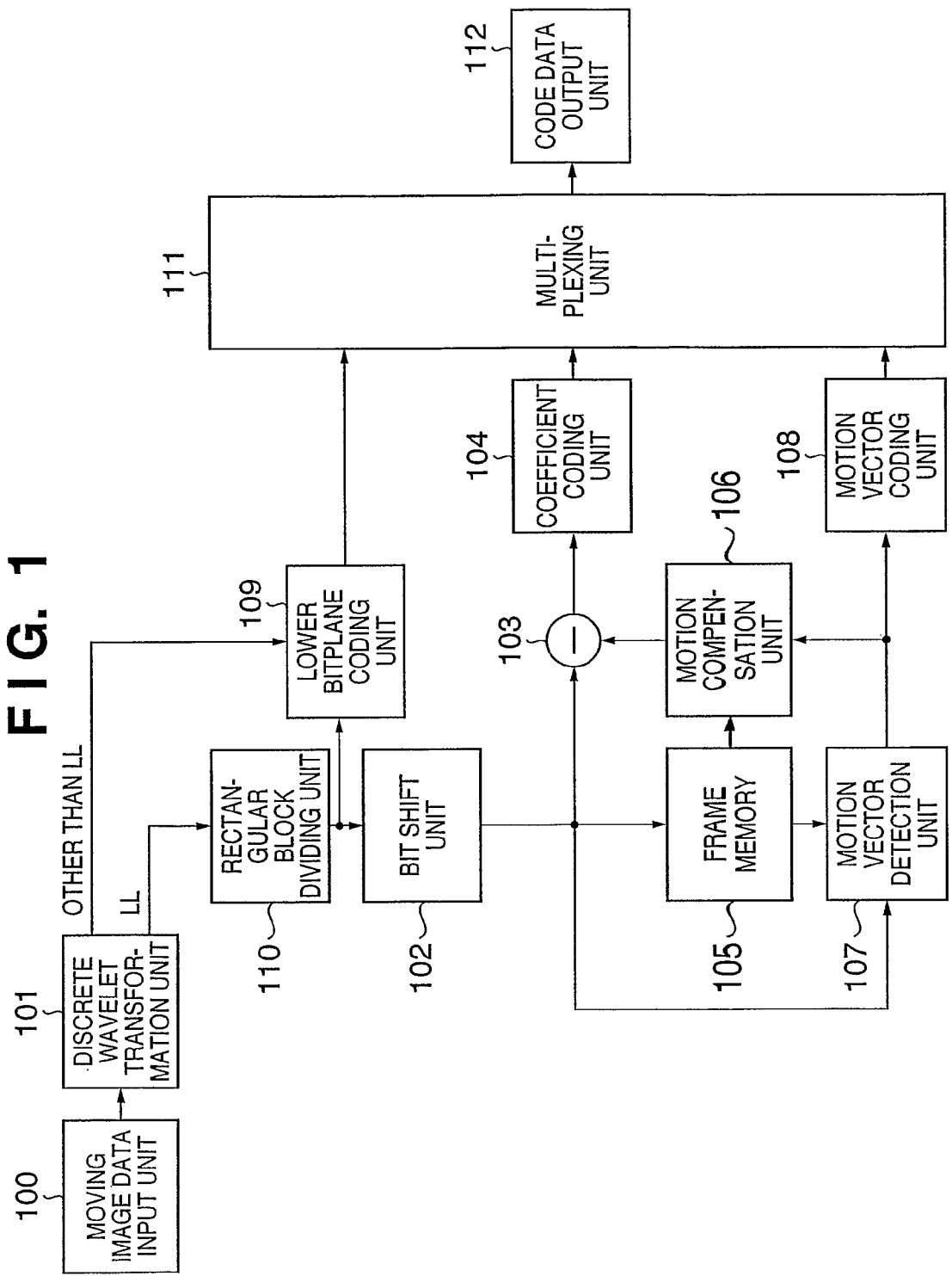

FIG. 8

| SUBBAND/Q FACTOR | | | | | | | | | | |
|---|---|---|---|---|---|---|---|---|---|---|
| HH2 | 0 | 1 | 2 | 3 | 4 | 5 | 6 | 7 | 8 | 9 |
| HL2(LH2) | 0 | 1 | 2 | 3 | 4 | 5 | 5 | 6 | 6 | 6 |
| HH1 | 0 | 1 | 2 | 3 | 4 | 5 | 5 | 6 | 6 | 6 |
| HL1(LH1) | 0 | 1 | 2 | 3 | 4 | 5 | 5 | 6 | 6 | 6 |
| LL | 0 | 0 | 1 | 2 | 3 | 3 | 4 | 4 | 5 | 5 |
| | 0 | 0 | 0 | 0 | 1 | 1 | 2 | 2 | 2 | 3 |

FIG. 16

| INDEX | SUBBAND SB | NON-DECODING BITPLANE COUNT ND(SB) |
|---|---|---|
| 0 | HH2 | 1 |
| 1 | LH2 | 1 |
| 2 | HL2 | 1 |
| 3 | HH1 | 1 |
| 4 | LH1 | 0 |
| 5 | HL1 | 0 |
| 6 | LL | 0 |

FIG. 19

| SUBBAND INDEX SI | SUBBAND S |
|---|---|
| 0 | HH2 |
| 1 | LH2 |
| 2 | HL2 |
| 3 | HH1 |
| 4 | LH1 |
| 5 | HL1 |
| 6 | LL |

FIG. 24

| SUBBAND Sb | THRESHOLD TB(Sb) |
|---|---|
| HH2 | 6 |
| LH2 | 4 |
| HL2 | 4 |
| HH1 | 4 |
| LH1 | 2 |
| HL1 | 2 |
| LL | 0 |

MOVING IMAGE CODING APPARATUS, MOVING IMAGE DECODING APPARATUS, CONTROL METHOD THEREFOR, COMPUTER PROGRAM, AND COMPUTER-READABLE STORAGE MEDIUM

This application is a National Stage Filing Under 35 U.S.C. §371 of International Application No. PCT/JP2005/004851, filed Mar. 11, 2005, and published in English as International Publication No. WO 2005/088977 A1 on Sep. 22, 2005, which claims priority to Japanese Patent Application Nos. 2004-071400, filed Mar. 12, 2004 and 2005-013032, filed Jan. 20, 2005, hereby incorporated by reference.

TECHNICAL FIELD

The present invention relates to a compression coding technique and decoding technique for moving images.

BACKGROUND ART

Recently, contents flowing through networks have increased in volume and diversity from character information to still image information, further to moving image information. Accordingly, coding techniques for compressing information amounts have been developed. The developed coding techniques Save been standardized internationally and widely spread.

On the other hand, networks themselves have increased capacity and diversity, and hence one content from the transmitting side passes through various environments until it reaches the receiving side. In addition, transmitting/receiving-side devices have diversified in terms of processing performance. General-purpose information processing apparatuses such as personal computers (to be referred to as PCs hereinafter) mainly used as transmission/reception devices have exhibited great improvements in performance such as CPU performance and graphics performance. On the other hand, devices with different types of processing performance, e.g., a PDA, cell phone, TV set, and hard disk recorder, have been equipped with network connection functions. Under the circumstances, a great deal of attention has been paid to a function called scalability, which can cope with changing communication line capacities and the processing performance of receiving-side devices with one data.

The JPEG 2000 coding scheme is widely known as a still image coding scheme having this scalability function. For example, this scheme is disclosed in ISO/IEC 15444-1 (Information technology—JPEG 2000 image coding system—Part 1: Core coding system).

A characteristic feature of this scheme is that DWT (Discrete Wavelet Transformation) is performed for input image data to discretize the data into a plurality of frequency bands. The coefficients of the respective frequency bands are quantized, and the quantized values are arithmetically coded for each bitplane. This scheme allows fine control of layers by coding or decoding only a necessary number of bitplanes.

In addition, the JPEG 2000 coding scheme has realized a so-called ROI (Region Of Interest) technique of relatively improving the image quality of a region of interest in an image, which does not exist in the conventional coding techniques.

FIG. 20 shows a coding sequence in the JPEG 2000 coding scheme. A tile segmentation unit 9001 segments an input image into a plurality of regions (tiles) (this function is optional, and input image=1 tile may be set). A DWT unit 9002 performs discrete wavelet transformation to discretize data into frequency bands. A quantization unit 9003 quantizes each coefficient (this function is optional). An ROI unit 9007 (option) sets a region of interest. The quantization unit 9003 performs shift up. An entropy coding unit 9004 performs entropy coding by the EBCOT (Embedded Block Coding with Optimized Truncation) scheme. A bitplane round-down unit 9005 performs rate control by rounding down the code data of lower bitplanes of the coded data, as needed. A code forming unit 9006 adds header information to the data and selects various types of scalability functions, thereby outputting code data.

FIG. 21 shows a decoding sequence in the JPEG 2000 coding scheme. A code analyzing unit 9020 analyzes a header to obtain information for forming layers. A bitplane round-down unit 9021 rounds down lower bitplanes of the input code data in accordance with the capacity of an internal buffer and the decoding capability. An entropy decoding unit 9022 decodes the code data based on the EBCOT coding scheme to obtain quantized wavelet transformation coefficients. A dequantization unit 9023 dequantizes the coefficients. An inverse DWT unit 9024 performs inverse discrete wavelet transformation for the dequantized coefficients to reproduce image data. A tile combining unit 9025 combines a plurality of tiles to reproduce image data (when 1 frame=1 tile, no combining operation is required).

The above JPEG 2000 coding technique is mainly suitable for still image coding. A reference: ISO/IEC 15444-3 (Information technology—JPEG 2000 image coding system Part 3: Motion JPEG 2000)) has also recommended Motion JPEG 2000, which is a technique of coding a moving image by making the above technique correspond to each frame of the moving image. According to this scheme, it is impossible to reduce the code amount.

The MPEG coding method is known as a technique directed from the beginning to moving image compression. For example, this method is disclosed in "Latest MPEG Textbook" (ASCII Publishing, p. 76, 1994). In this coding technique, motion compensation is performed between frames to improve the coding efficiency (non-patent reference 3). FIG. 22 shows an arrangement for this coding operation. A block segmentation unit 9031 segments an input image into 8×8 pixel blocks. A differential unit 9032 subtracts predicted data from the resultant data by motion compensation. A DCT unit 9033 performs discrete cosine transformation. A quantization unit 9034 performs quantization. The resultant data is coded by an entropy coding unit 9035. A code forming unit 9036 adds header information to the resultant data to output code data.

At the same time, a dequantization unit 9037 dequantizes the data. An inverse DCT unit 9038 performs inverse transformation to discrete cosine transformation. An addition unit 9039 adds predicted data to the resultant data and stores it in a frame memory 9040. A motion compensation unit 9041 obtains a motion vector by referring to the input image and a reference frame stored in the frame memory 9040, thereby generating predicted data.

Consider a case wherein the scheme of coding bitplanes so as to realize scalability as in JPEG 2000 is applied to the above MPEG coding technique. In this case, when the information of a portion which has been referred to for motion compensation is lost by abortion of bitplane coding, errors due to motion compensation are accumulated, resulting in a deterioration in image quality. This point will be described in detail below.

When the JPEG 2000 technique is to be applied to the MPEG technique, the DCT unit 9033 and inverse DCT unit 9038 in FIG. 22 are replaced with a discrete wavelet transformation unit and inverse discrete wavelet transformation unit, and the entropy coding unit 9035 performs coding for each bitplane.

In an apparatus on the coding side, a target frame which is an input frame to be coded is defined as $F_i$, and a frame input immediately before the target frame is defined as $F_{i-1}$. In this case, if an quantization error in the quantization unit 9034 is ignored, a frame image immediately before being stored in the frame memory 9040 is identical to $F_{i-1}$. Therefore, no problem arises in terms of coding errors due to motion compensation on the coding side.

Consider the decoding side. A decoding apparatus is opposite in function to a coding apparatus, and hence obviously includes a frame memory which stores the frame $F_{i-1}$ immediately before being referred to for motion compensation when the target frame $F_i$ is decoded. Consider a case wherein decoding is performed by using the scalability of JPEG 2000 without using the code data of a given bitplane.

In this case, letting $F'_{i-1}$ be the image of a frame immediately before being stored in the frame memory of the decoding apparatus, the image $F'_{i-1}$ does not become identical to the frame image $F_{i-1}$. This is because the code data of a bitplane which is not used exists in decoding processing.

The code data of each block in the target frame is code data based on the difference from a block at the position indicated by a motion vector in the immediately preceding frame $F_{i-1}$. Since the immediately preceding frame image is not $F_{i-1}$ but is $F'_{i-1}$ in spite of this fact, the target frame $F_i$ cannot be properly decoded either. Obviously, as a consequence, a similar problem arises in each frame following the target frame, and hence errors are gradually accumulated, resulting in an image which is far from the intended image.

DISCLOSURE OF INVENTION

The present invention has been made to solve the above problems, and has as its object to provide a technique of preventing errors from being gradually accumulated on the decoding side, while maintaining high scalability, even when applying to moving image coding a technique of transforming a frame into a plurality of subbands as frequency components, like discrete wavelet transformation.

In order to achieve this object, for example, a moving image coding apparatus according to the present invention has the following arrangement.

There is provided a moving image coding apparatus which codes time-series frames constituting moving image data, comprising:

decomposition means for decomposing a frame into a plurality of subbands having different frequency components;

first extraction means for classifying the plurality of subbands into a first group and a second group and extracting, as motion compensation target data, data of a predetermined number of upper bits of frequency component coefficient data forming subbands belonging to the first group;

second extraction means for extracting data of a predetermined number of lower bits of each of frequency component coefficient data forming subbands belonging to the first group;

motion compensation means for generating motion vector information and predicted value information on the basis of motion compensation target data of a current frame extracted by the first extraction means and decoded data corresponding to motion compensation target data obtained when a preceding frame is coded;

first coding means for obtaining a difference value between predicted value information generated by the motion compensation means and motion compensation target data of the current frame and coding the difference value and the motion vector information;

second coding means for coding, as non-motion compensation target data, data of a predetermined number of lower bits of each frequency component coefficient data extracted by the second extraction means and frequency component coefficient data of subbands belonging to the second group; and multiplexing means for multiplexing the code data obtained by the first coding means and the second coding means.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

FIG. 1 is a block diagram showing the arrangement of a moving image coding apparatus according to the first embodiment;

FIG. 8 is a view showing an example of the correspondence relationship between Q factors and the non-decoding bitplane counts of the respective subbands according to the first embodiment;

FIG. 16 is a view showing an example of a table held in a non-decoding bitplane decision unit 1003 of the moving image decoding apparatus according to the second embodiment;

FIG. 19 is a view showing the correspondence between subband indexes SI and subbands according to the second embodiment;

FIG. 24 is a view showing an example of a threshold TB(Sb) table held in threshold holding units 2301 and 2500.

BEST MODE FOR CARRYING OUT THE INVENTION

Figure 2C:
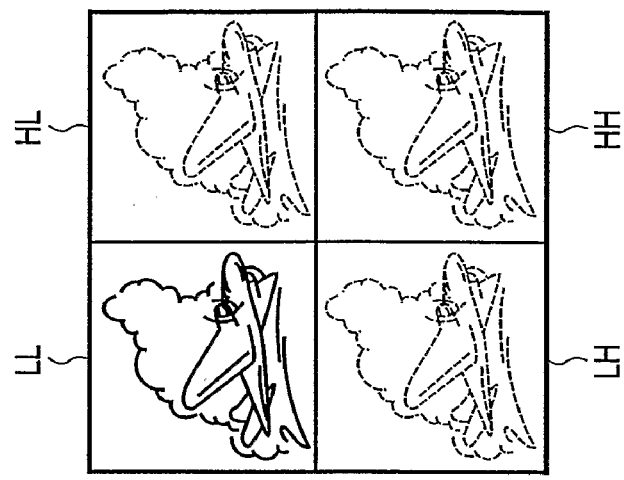
FIGS. 2A to 2C are views for explaining the subbands of an image to be coded which is processed by two-dimensional discrete wavelet transformation.

The embodiments of the present invention will be described in detail below with reference to the accompanying drawings.

First Embodiment

FIG. 1 is a block diagram showing the arrangement of a moving image coding apparatus according to the first embodiment. Referring to FIG. 1, reference numeral 100 denotes a moving image data input unit; 101, a discrete wavelet transformation unit; 102, a bit shift unit; 103, a subtracter; 104, a coefficient coding unit; 105, a frame memory; 106, a motion compensation unit; 107, a motion vector detection unit; 108, a motion vector coding unit; 109, lower bitplane coding unit; 110, a rectangular block dividing unit; 111, a multiplexing unit; and 112, a code data output unit.

The operation of each constituent element of the moving image coding apparatus shown in FIG. 1 will be described next. Assume that the input frame rate of the moving image data input unit 100 is 30 frames/sec, and the image of each frame is monochrome moving image data with each pixel having a luminance value of eight bits. Assume that the data of such a moving image is captured in the moving image coding apparatus by an amount corresponding to four sec (a: total of 120 frames), and is coded. Note that the above settings are for the sake of facilitating the understanding of the embodiment.

First of all, four-sec moving image data (=120 frames) including 30 frames per sec is input from the moving image data input unit 100. The moving image data input unit 100 is, for example, an image sensing unit such as a digital camera, and can be implemented by an image sensing device such as a CCD and various kinds of image adjusting circuits for gamma correction, shading correction, and the like. In some cases, this unit may be designed to receive the result obtained by A/D-converting a sensed video from a video camera. An input moving image may be stored in a semiconductor memory such as a RAM or may be temporarily stored in a large-capacity storage device such as a hard disk which is low in price per unit capacity.

The moving image data input unit 100 sends input moving image data, frame by frame, to the discrete wavelet transformation unit 101. Note that in the following description, for the sake of convenience, the respective frame data are sequentially numbered from 1 in input order, like a frame f1, frame f2, . . . , thereby identifying each frame. Let x be a pixel position (coordinate) in the horizontal direction of each frame, y be a pixel position in the vertical direction, and P(x, y) be a pixel value at a pixel position (x, y). In this embodiment, one pixel comprises eight bits, and hence takes a value satisfying $0 \leq P(x, y) \leq 255$.

Figure 2B:
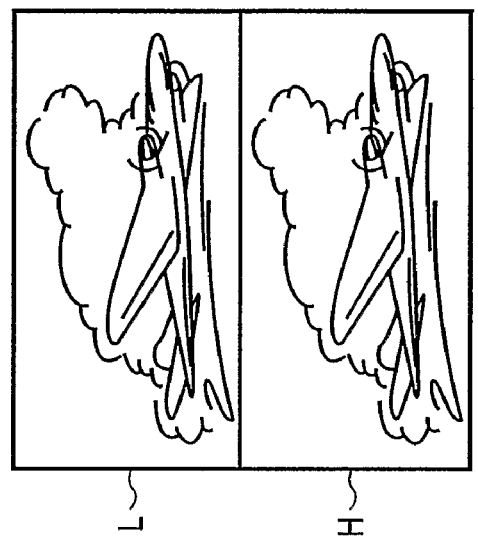

One-frame image data input from the moving image data input unit 100 is properly stored in an internal buffer (not shown) in the discrete wavelet transformation unit 101 to be subjected to two-dimensional discrete wavelet transformation. Two-dimensional discrete wavelet transformation is realized by applying one-dimensional discrete wavelet transformation to the data in the horizontal and vertical directions FIGS. 2A to 2C are views for explaining the processing of generating four subbands by performing two-dimensional discrete wavelet transformation for one-frame image data.

Figure 2A:
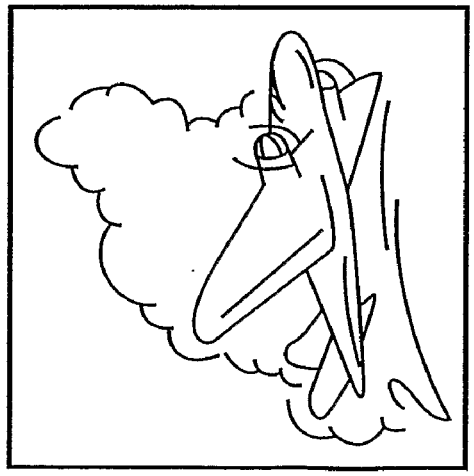

FIG. 2A is a view showing one-frame image data to be coded. When an image to be coded like the one shown in FIG. 2A is processed while a one-dimensional discrete wavelet transformation filter in the vertical direction is shifted in the horizontal direction, the image can be decomposed into a low-frequency subband L and high-frequency subband H. When each subband is processed while a one-dimensional discrete wavelet transformation filter in the horizontal direction is shifted in the vertical direction, the respective subbands can be decomposed into four subbands LL, HL, LH, and HH which are two-dimensional discrete wavelet transformation results like those shown in FIG. 2C.

Figure 3:
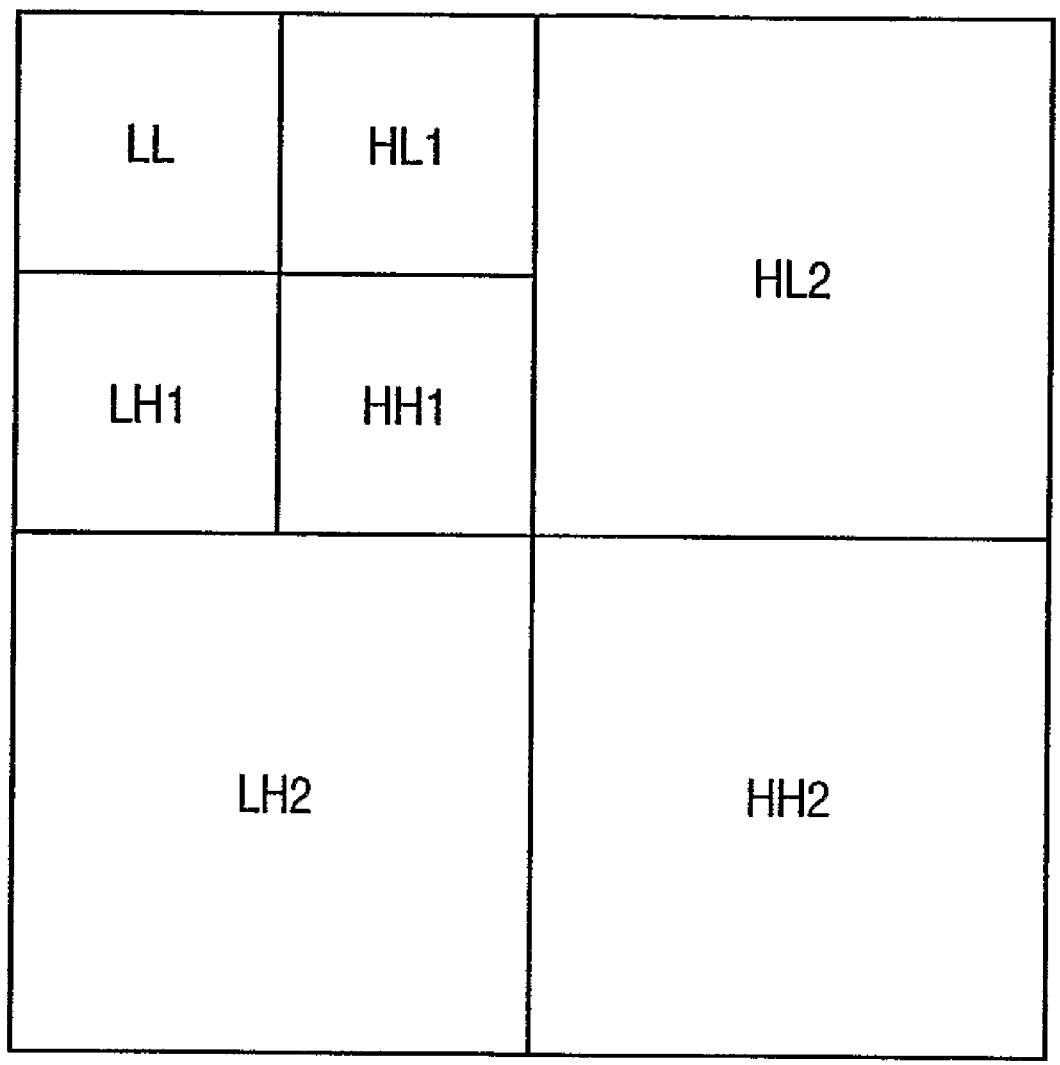
FIG. 3 is a view showing seven subbands obtained by performing two-dimensional discrete wavelet transformation twice.

The discrete wavelet transformation unit 101 in this moving image coding apparatus repeats similar processing to apply two-dimensional discrete wavelet transformation to the subband LL obtained by the above two-dimensional discrete wavelet transformation. This makes it possible to decompose the image to be coded into seven subbands LL, LH1, HL1, HH1, LH2, HL2, and HH2. FIG. 3 is a view showing the seven subbands obtained by performing two-dimensional discrete wavelet transformation twice.

Note that in this moving image coding apparatus, a coefficient in each subband is represented by C(Sb, x, y) where Sb represents the type of subband, i.e., one of LL, LH1, HL1, HH1, LH2, HL2, and HH2. In addition, (x, y) represents a coefficient position (coordinates) in the horizontal and vertical directions when the coefficient position at the upper left corner in each subband is represented by (0, 0).

In this case, the discrete wavelet transformation unit 101 performs one-dimensional wavelet transformation for N one-dimensional signals x(n) (where n is an integer from 0 to N−1) using an integer type 5×3 filter represented by:

$$h(n) = x(2n+1) - \text{floor}\{(x(2n)+x(2n+2))/2\} \quad (1)$$

$$l(n) = x(2n) + \text{floor}\{(h(n-1)+h(n)+2)/4\} \quad (2)$$

where h(n) is a coefficient of a high-frequency subband, l(n) is a coefficient of a low-frequency subband, and floor{R} is the maximum integral value that does not exceed a real number R. Note that values x(n) at the two ends (n<0 and n>N−1) of a one-dimensional signal x(n) which are required for the calculation of equations (1) and (2) are obtained in advance from the value of the one-dimensional signal x(n) (n=0 to N−1) by a known method.

Assume that in this embodiment, each coefficient obtained upon execution of wavelet coding has a 1-bit sign representing a polarity.

The rectangular block dividing unit 110 divides a coefficient C(LL, x, y) of the subband LL, of the coefficients of the subbands generated by the discrete wavelet transformation unit 101, into a plurality of rectangular blocks B1, B2, . . . , Bn each having a width Wb and a height Hb. The rectangular block dividing unit 110 reads coefficients in respective blocks in the subband LL in the raster scan order and outputs them to the bit shift unit 102.

The bit shift unit 102 extracts an upper bit portion of the coefficient C(LL, x, y) input from the rectangular block dividing unit 110 by shifting the coefficient to the right by a predetermined bit count Tb (equivalent to quantization (division) by a quantization step $2^{Tb}$). More specifically, the bit shift unit 102 obtains an upper bit portion U(LL, x, y) of the coefficient value C(LL, x, y) according to equation (3) and outputs the upper bit portion:

$$U(LL,x,y)=\text{sign}\{C(LL,x,y)\} \times \text{floor}\{\|C(LL,x,y)\|/2^{Tb}\} \quad (3)$$

where sign{I} is a function representing the sign of an integer I, which returns 1 when I is positive, and −1 when I is negative, floor{R} is the maximum integral value that does not exceed a real number R, and ∥R∥ represents the absolute value of the real number R.

The frame memory 105 has areas for storing the coefficients of two subbands LL. The upper bit portion of the coefficient of the subband LL in the immediately preceding frame is stored in one area. The upper bit portion U(LL, x, y) of the coefficient of the subband LL in a target frame which is generated by the bit shift unit 102 is stored in the other area.

Figure 6B:
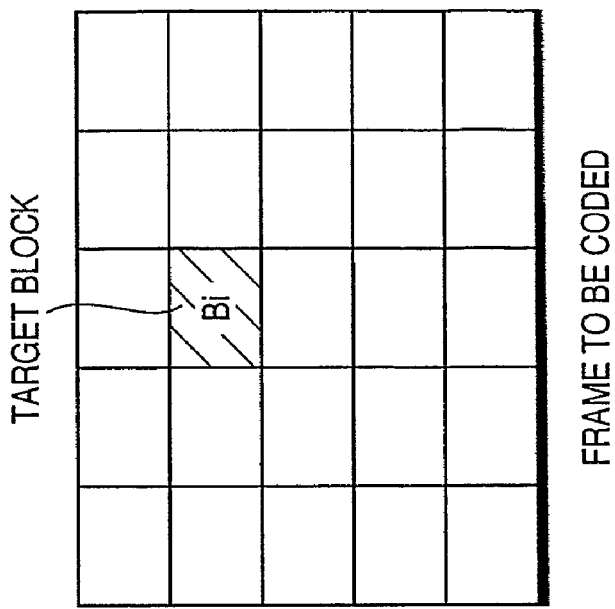
FIGS. 6A and 6B are views showing the relationship between a target block, a reference block and a motion vector.
Figure 6A:
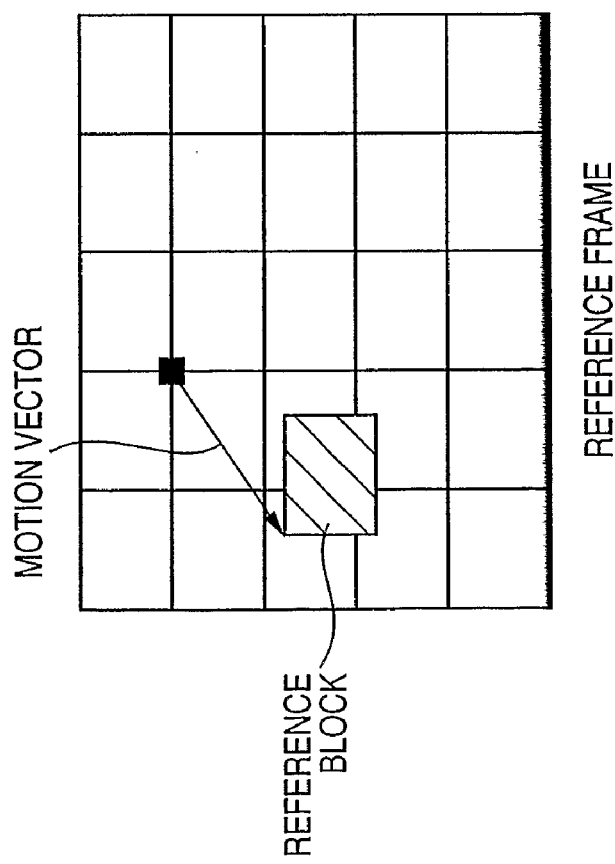

The motion vector detection unit 107 searches for a motion vector for each block with respect to U(LL, x, y) generated by the bit shift unit 102 by using the quantized subband LL in the immediately preceding frame stored in the frame memory 105 as a reference frame. The motion vector detection unit 107 detects a block (to be referred to as a reference block hereinafter) in the reference frame which exhibits the minimum error with respect to the target block, and outputs, as a motion vector, a relative position concerning the coordinates of the detected block with reference to the coordinates of the target block. FIG. 6B shows a target block Bi in the target frame. FIG. 6A shows the relationship between the target block Bi, the reference block in the preceding frame, and the motion vector.

The motion compensation unit 106 reads out the coefficient value of the reference block from the frame memory 105 on the basis of the motion vector calculated by the motion vector detection unit 107 with respect to the target block Bi, and outputs the read value as a predicted value.

The subtracter 103 obtains the difference between U(LL, x, y) of the target block and the predicted value output from the motion compensation unit 106, and outputs the difference as a prediction error value.

The coefficient coding unit 104 codes the prediction error value output from the subtracter 103 for each block and generates a code sequence. Any coding method can be used by the coefficient coding unit 104 as long as it is suitable to code a prediction error value. For example, the coefficient coding unit 104 can use a technique similar to the prediction error signal coding technique in JPEG-LS (ISO/IEC 14495-1 and 2) recommended as international standards for lossless compression and quasi-lossless compression of continuous-tone still images, or a technique similar to the code block coding technique in JPEG 2000 Part 1 (ISO/IEC 15444-1).

The motion vector coding unit 108 codes the motion vector output from the motion vector detection unit 107. As a motion vector coding technique, a motion vector coding technique in MPEG or the like can be used.

With regard to the information of lower Tb bits of the coefficient C(LL, x, y) of the subband LL which is lost by the bit shift processing (quantization processing) performed by the bit shift unit 102, the lower bitplane coding unit 109 codes the respective bitplanes from bit 0, which is the LSB, to bit Tb−1 on a bitplane basis.

In this case, since the lower Tb bits of the coefficient C(LL, x, y) of the subband LL are coded, bits upper than the bit Tb are regarded as coded bits. That is, as described above, only bitplanes between bit 0 and bit Tb−1 are effective. Bitplanes are coded from a bitplane of the upper bit Tb−1 to a lower bitplane. If all the bits upper than bit Tb of the target coefficient C(LL, x, y) are 0, i.e., U(LL, x, y) is 0, bit "1" is detected first, and sign "0" or "1" representing the polarity of a coefficient having "1" is added. The resultant data is then coded.

As a technique used to code bitplanes in the lower bitplane coding unit 109, any method which is suitable to code binary information can be used. For example, the lower bitplane coding unit 109 can use, for example, a method of classifying coefficients into a plurality of contexts according to the states on the basis of whether coefficients around a target coefficient are significant or insignificant, and using binary arithmetic coding. In this case, that a given coefficient is significant means that when a target bit is coded, it is already known that the coefficient is not 0. That a given coefficient is insignificant means that there is a possibility that the coefficient may be 0. The respective bits in a target bitplane are classified into a plurality of categories (sub-bitplanes), and can be coded for each category by a plurality of number of times of scanning. The code block coding technique in international standard JPEG 2000 is suitable as a bitplane coding scheme used in the lower bitplane coding unit 109.

The coefficients of subbands other than the subband LL are also coded by the lower bitplane coding unit 109 on a bitplane basis. Since subbands other than the subband LL have no information corresponding to U(LL, x, y) of the subband LL, the bits from the most significant bit to the least significant bit are coded for each bitplane, and the most significant bit "1" of each coefficient is coded. Thereafter, the sign representing a polarity is represented by "0" or "1" and coded.

Figure 15:
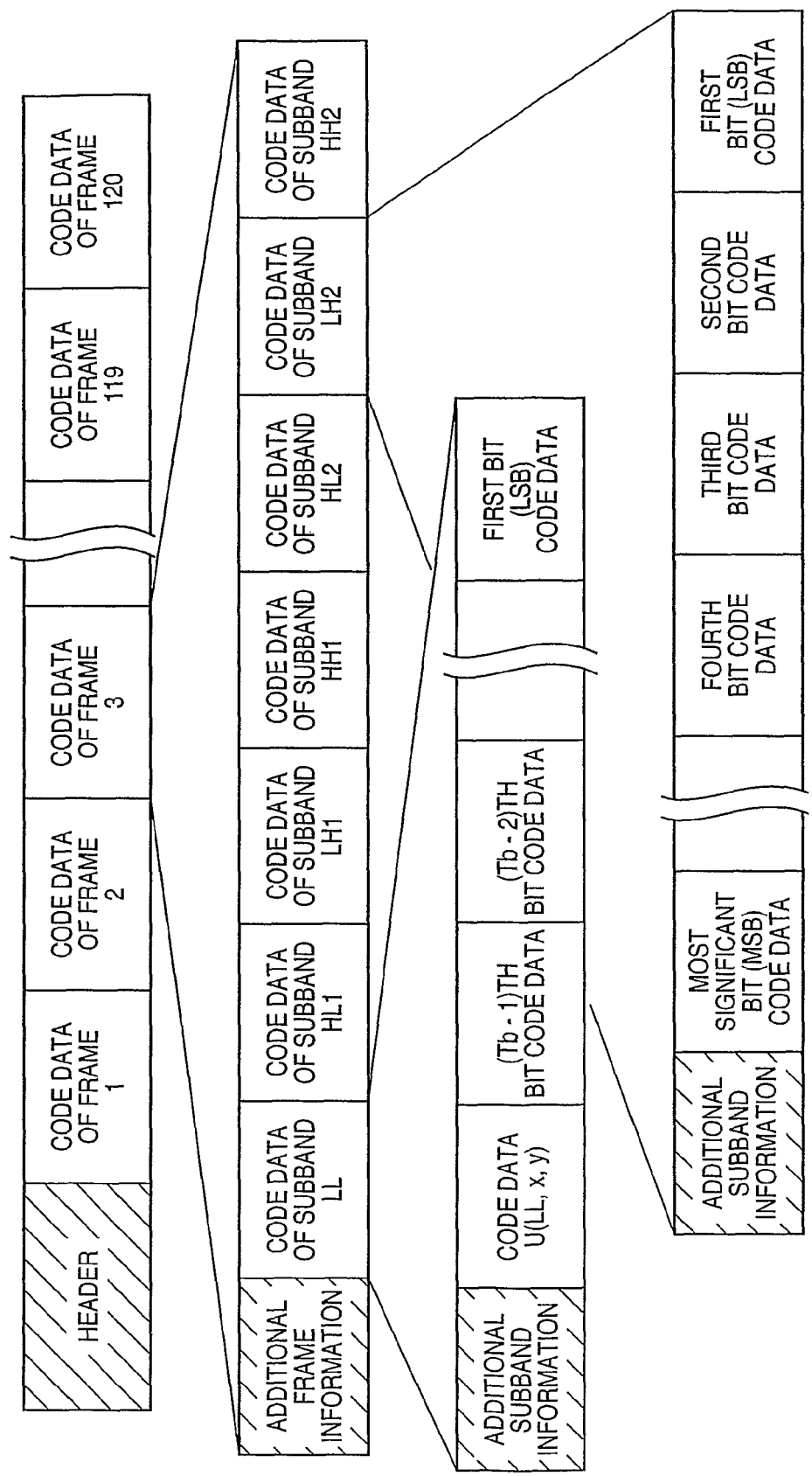
FIG. 15 is a view showing the structure of moving image code data generated by the moving image coding apparatus according to the first embodiment.

The multiplexing unit 111 combines code sequences output from the motion vector coding unit 108, coefficient coding unit 104, and lower bitplane coding unit 109 while storing them in the internal buffer (not shown), and adds various kinds of information necessary for decoding as a header to the code sequence, thereby forming a final code sequence as an output from the moving image coding apparatus of this embodiment. As a method of forming a code sequence, a method of arranging code sequences in various orders like a code sequence forming method in international standards JPEG 2000 is available. FIG. 15 shows an example of the format of a code sequence output from the multiplexing unit 111 when code sequences are arranged in subband order from the subband LL to the subband HH2. Referring to FIG. 15, the code data U(LL, x, y) in the code data of the subband LL contains the motion vector code data generated by the motion vector coding unit 108 and the code data U(LL, x, y) generated by the coefficient coding unit 104. In addition, the (Tb−1)th code data (the code data of the bitplane of bit Tb−1) to the 1st (LSB) code data (the code data of the bitplane of bit 0) in the code data of the subband LL contain the code data of the lower Tb bitplane of the subband LL generated by the lower bitplane coding unit 109. The code data of subbands other than the subband LL contain the code data of the uppermost bit (MSB) to the code data of the first bit (LSB) of each subband generated by the lower bitplane coding unit 109.

The code data output unit 112 outputs the moving image code data output from the multiplexing unit 111 to the outside of the apparatus. The code data output unit 112 can be implemented by, for example, an interface with a network line or a secondary storage device such as a hard disk or memory.

Figure 14:
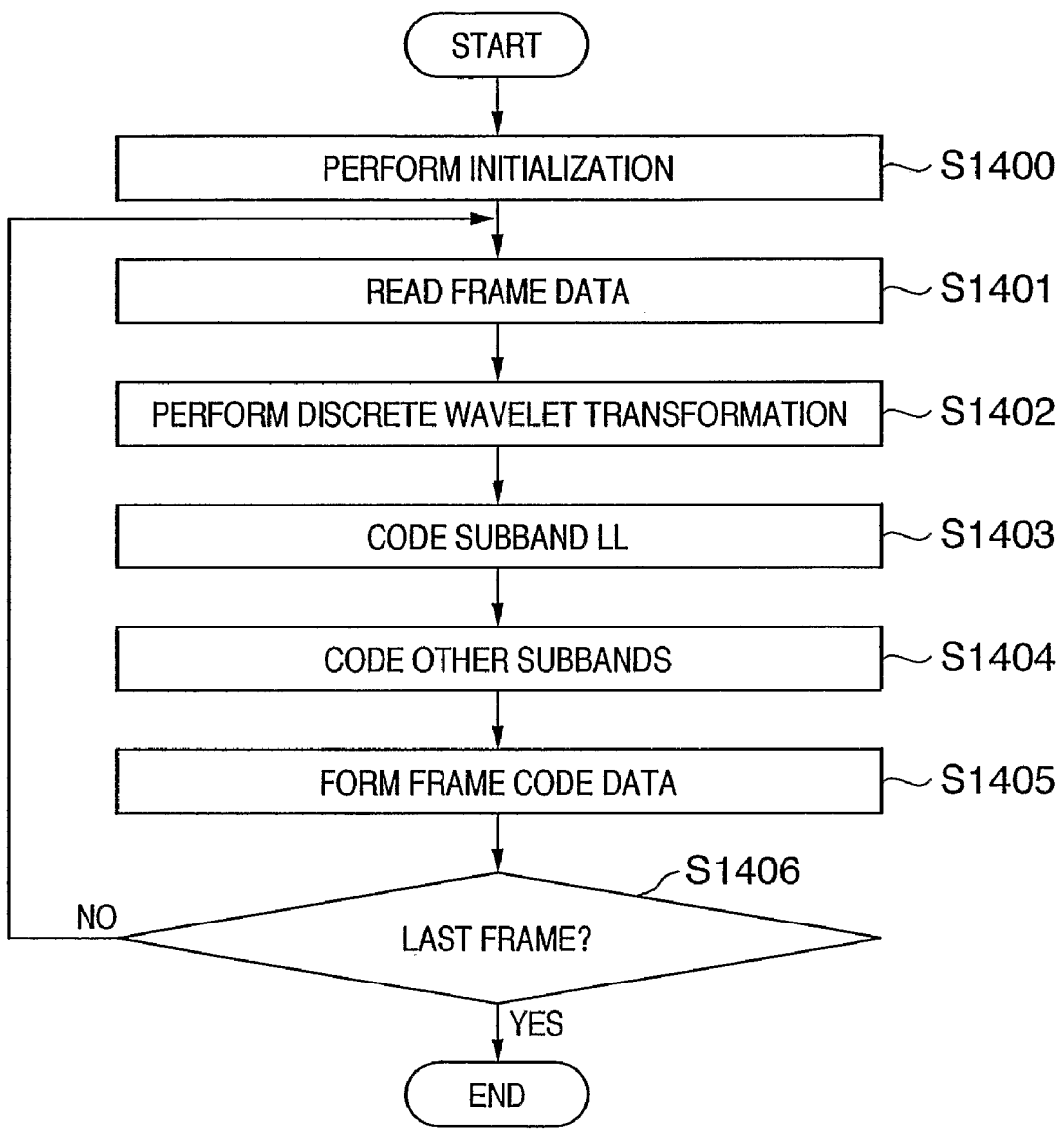
FIG. 14 is a flowchart showing the flow of processing in the moving image coding apparatus according to the first embodiment.

Moving image coding processing in this embodiment has been described above. A sequence for this processing will be described more clearly with reference to FIG. 14. The moving image coding apparatus of this embodiment performs initialization processing, e.g., clearing the frame memory 105, before coding of a moving image to be coded (step S1400).

The moving image data input unit 100 then reads one-frame image data and sends it to the discrete wavelet transformation unit 101 (step S1401). The discrete wavelet transformation unit 101 executes wavelet transformation for the frame data to be coded a predetermined number of times (step S1402). The rectangular block dividing unit 110, bit shift unit 102, subtracter 103, motion vector detection unit 107, motion compensation unit 106, motion vector coding unit 108, coefficient coding unit 104, and lower bitplane coding unit 109 code the coefficient of the subband LL generated by the discrete wavelet transformation unit 101 (step S1403). The flow of processing in step S1403 will be described later.

The lower bitplane coding unit 109 then codes subbands other than the subband LL for each subband (step S1404).

Subsequently, the multiplexing unit 111 combines the code sequences from the coefficient coding unit 104, motion vector coding unit 108, and lower bitplane coding unit 109 to form the code data of the frame (step S1405).

It is then determined whether or not the coded frame is the last frame (step S1406). If the coded frame is not the last frame, the flow returns to step S1401 to perform coding processing for the next frame data in the same manner. If the coded frame is the last frame, the code data output unit 112 finishes outputting the generated moving image code data, thereby terminating the coding processing.

Figure 13:
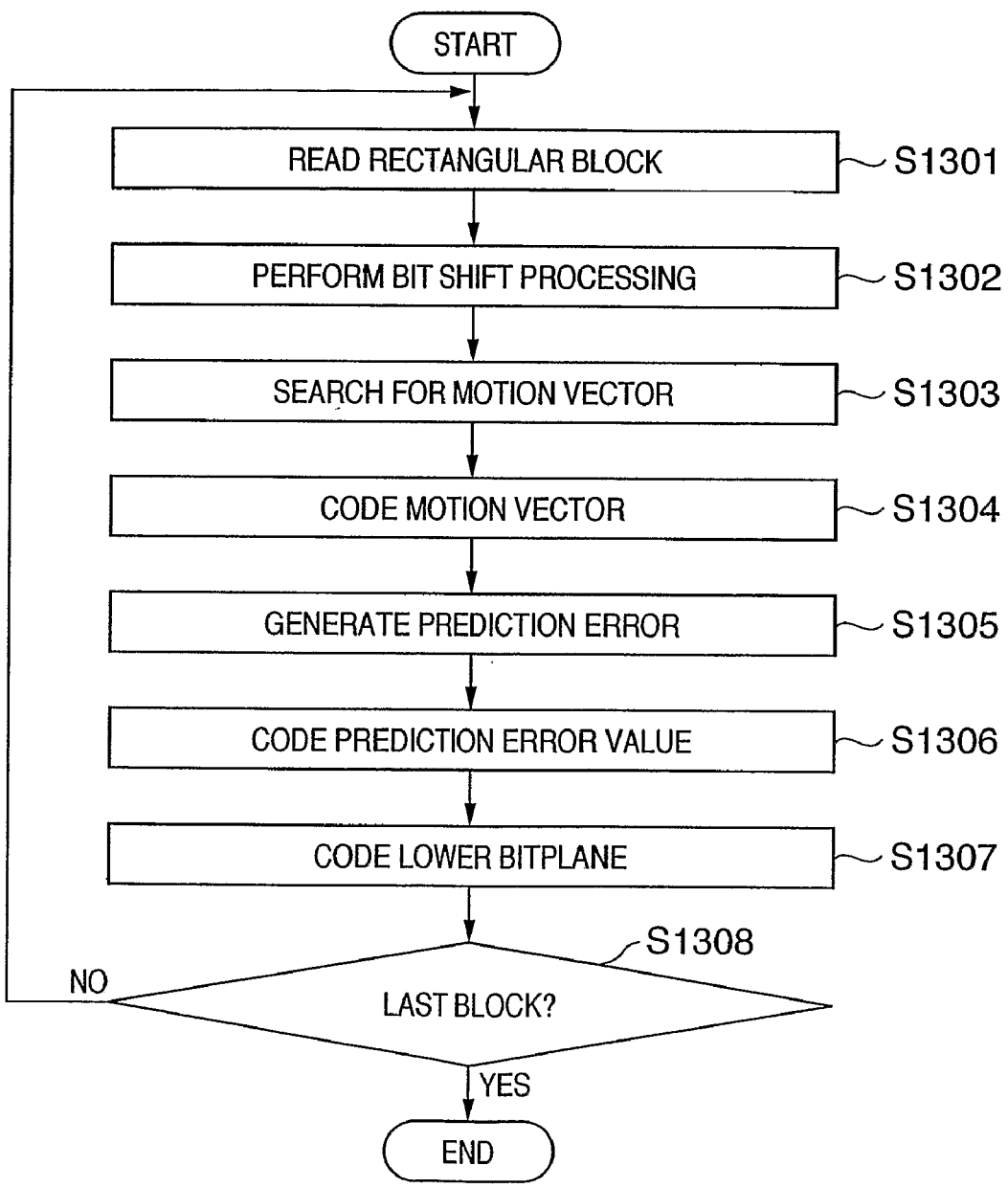
FIG. 13 is a flowchart showing the flow of coding processing for a subband LL in the moving image coding apparatus according to the first embodiment.

The flow of coding processing for the subband LL in step S1403 will be described next with reference to FIG. 13. First of all, the rectangular block dividing unit 110 reads out one-block coefficient data in the subband LL (step S1301). Subsequently, the bit shift unit 102 performs bit shift processing in the block and stores the value after the shift processing (quantized coefficient value) in the frame memory 105 (step S1302). The motion vector detection unit 107 searches the upper bit portion of the subband LL of the immediately preceding frame for a reference block exhibiting the minimum error with respect to the target block, and generates a motion vector (step S1303). The motion vector coding unit 108 codes this motion vector to generate a code sequence with respect to the motion vector (step S1304). The motion compensation unit 106 and subtracter 103 generate a prediction error of the target block (step S1305). The coefficient coding unit 104 codes this error and generates a code sequence of a plurality of upper bit portions of the block (step S1306). The lower bitplane coding unit 109 codes the information of the lower Tb bit portion of the target block for each bitplane to generate a cede sequence (step S1307). It is determined whether or not the coded block is the last block of the subband LL. If the coded block is not the last block, the flow returns to step S1301 to perform coding processing for the next rectangular block in the same manner. If the coded block is the last block, the coding processing for the subband LL is terminated.

Although the description is out of sequence, no frame exists before the first frame f1 of the moving image. If, however, that area of the frame memory 105 in which the LL components of the previous frame are stored is cleared to 0, the subtracter 103 subtracts 0 from the blocks of the current frame in effect. This operation is therefore equivalent to coding the start frame as an intra-frame.

A moving image decoding apparatus according to this embodiment will be described next.

Figure 4:
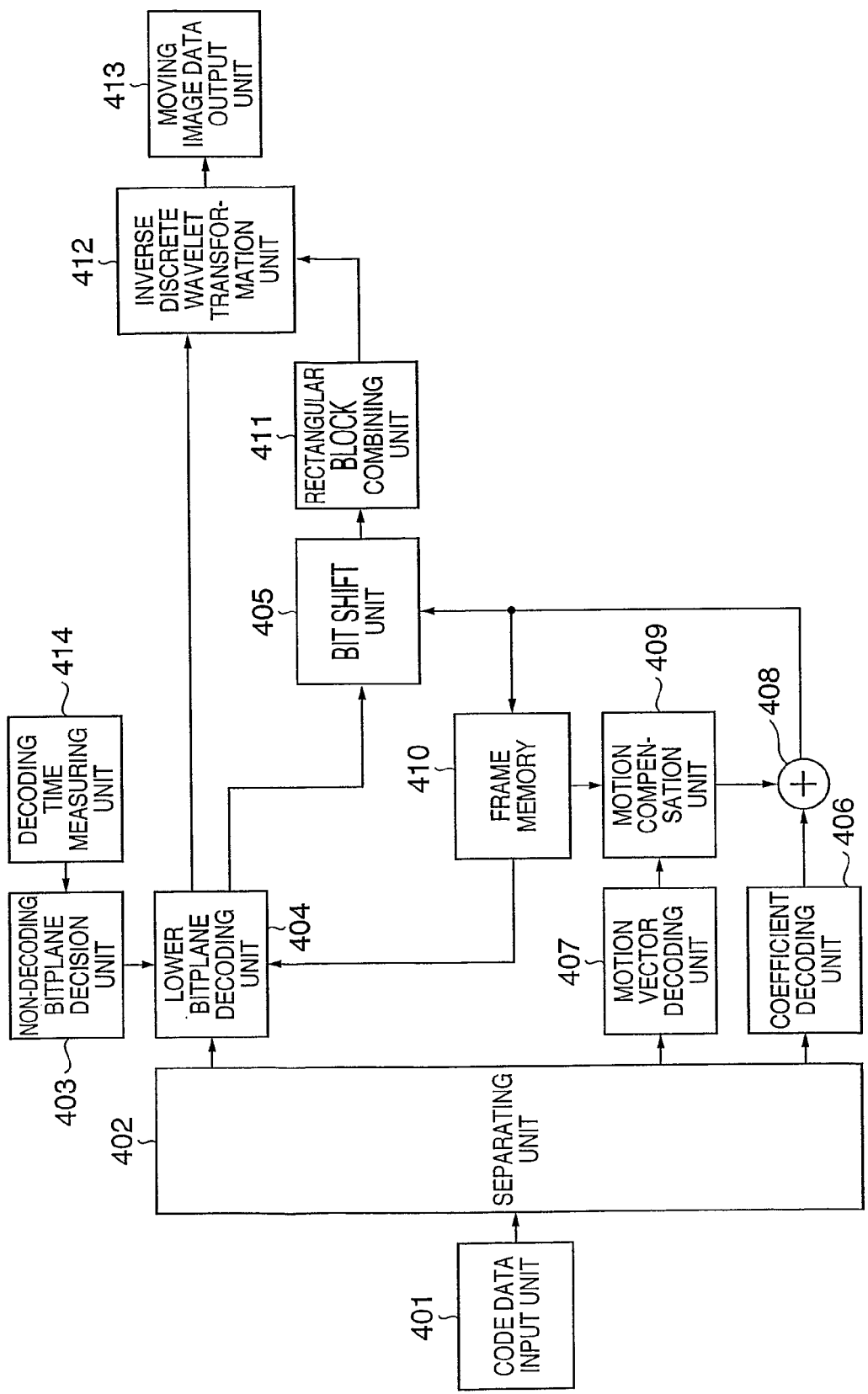
FIG. 4 is a block diagram showing the arrangement of a moving image decoding apparatus according to the first embodiment.
Figure 5:
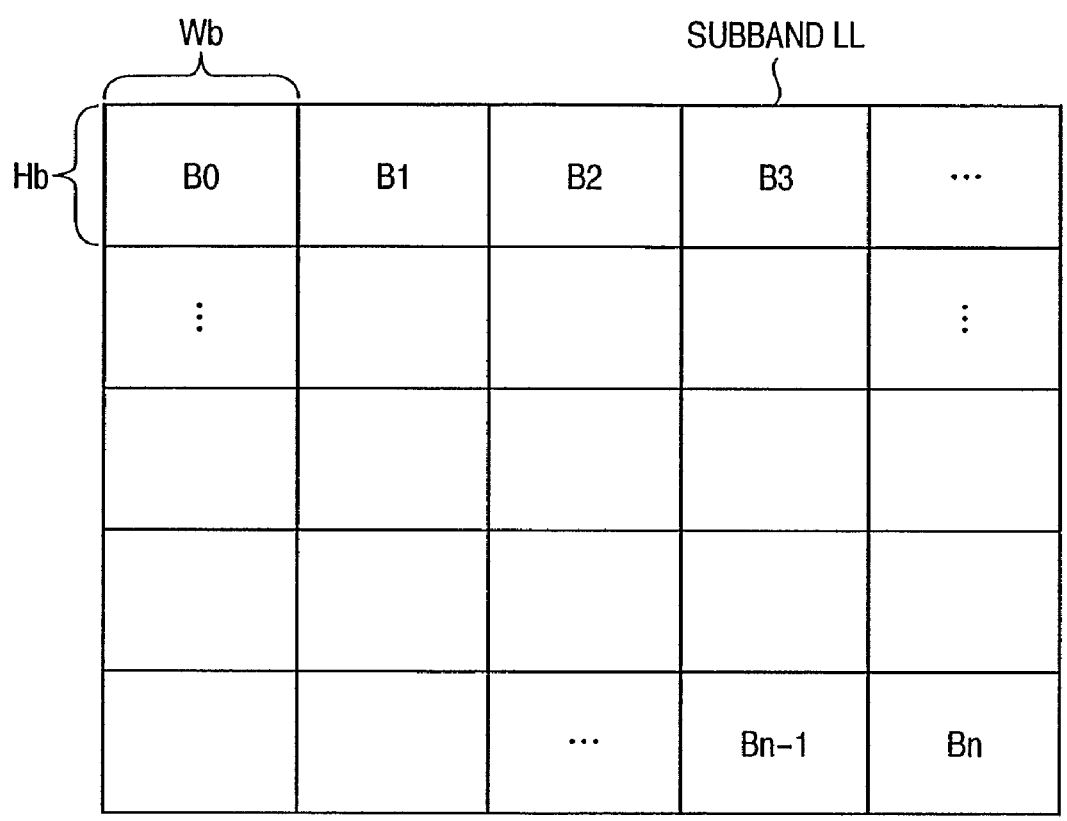
FIG. 5 is a view showing how a subband is divided into blocks.

FIG. 4 is a block diagram showing the arrangement of the moving image decoding apparatus according to this embodiment. Referring to FIG. 4, reference numeral 401 denotes a code data input unit; 402, a separating unit; 403, a non-decoding bitplane decision unit; 404, a lower bitplane decoding unit; 405, a bit shift unit; 406, a coefficient decoding unit; 407, a motion vector decoding unit; 408, an adder; 409, a motion compensation unit; 410, a frame memory; 411, a rectangular block combining unit; 412, an inverse discrete wavelet transformation unit; 413, a moving image data output unit; and 414, a decoding time measuring unit.

Moving image data decoding processing by the moving image decoding apparatus of this embodiment is basically the reverse processing to the above coding processing in the moving image coding apparatus. Therefore, a characteristic part of the decoding processing will be mainly described below, with other parts being briefly described as the operation of each constituent element. In addition, the frame memory 410 is cleared to "0" when a series of coded moving image data is played back. In decoding the first frame f1, therefore, the adder 408 adds 0, which is processing equivalent to decoding an intra-frame.

First of all, moving image code data to be decoded is input from the code data input unit 401. The input moving image code data is code data generated by the moving image coding apparatus described above.

The separating unit 402 analyzes the code data, and sends the motion vector code data of the subband LL to the motion vector decoding unit 407, the code data U(LL, x, y) of the subband LL to the coefficient decoding unit 406, and the code data of each bitplane to the lower bitplane decoding unit 404.

The motion vector decoding unit 407 decodes the motion vector coded by the motion vector coding unit 108 and outputs it.

Like the frame memory 105, the frame memory 410 has areas for storing the coefficients of the two subbands LL. The upper bit portion of the coefficient of the subband LL in the immediately preceding frame is stored in one area. The upper bit portion U(LL, x, y) of the coefficient of the subband LL of the target frame is stored in the other area. It is therefore guaranteed that neither the difference data of the LL components of the target frame stored in this frame memory nor the decoded image data of the LL components of the immediately preceding frame contain any errors.

The motion compensation unit 409 reads out a coefficient value of the reference block from the frame memory 410 on the basis of the motion vector decoded by the motion vector decoding unit 407, and outputs it as a predicted value.

The coefficient decoding unit 406 decodes a prediction error of the coefficient from the coefficient code data generated by the coefficient coding unit 104.

The adder 408 adds the predicted value output from the motion compensation unit 409 to the prediction error decoded by the coefficient decoding unit 406 to decode the upper bit portion U(LL, x, y) of the coefficient.

The lower bitplane decoding unit 404 decodes the bitplane code data generated by the lower bitplane coding unit 109. The sign of the coefficient contained in the code data of the bitplane is decoded at the same timing as that in coding. Note that the lower Tb bits of the coefficient of the subband LL are decoded by referring to the upper bit portion U(LL, x, y) of the coefficient stored in the frame memory 410, as needed.

In this case, however, the non-decoding bitplane decision unit 403 designates a lower bitplane count ND (Sb) not to be decoded with respect to each subband, and the lower bitplane decoding unit 404 performs no decoding processing for the number of lower bitplanes designated by the lower bitplane decoding unit 404. Assume that the coefficient of the subband HH2 is to be decoded, and the non-decoding bitplane count ND (HH2) provided by the non-decoding bitplane decision unit 403 is "2". In this case, the code data of the bitplane of the third bit (bit 2) from the most significant bitplane of the code data of the coefficient of the subband HH2 input from the separating unit 402 is decoded, but the bitplanes of the second bit (bit 1) and first bit (bit 0) are not decoded. Proper values are set for the bitplanes which are not decoded. For example, an intermediate value in the range of values which the coefficient can take is set. In this case, in the above example, when all the decoded portions of the coefficient are 0, "0" is set at the second bit (bit 1) and the first bit (bit 0). Otherwise, "1" is set at the second bit, and "0" is set at the first bit. When priority is to be given to processing speed, a simple method of setting all the portions to "0" may be used.

The bit shift unit 405 shifts decoded U(LL, x, y) to the left (in the upper bit direction) by Tb bits and combines the lower Tb bit portion with the information of the lower Tb bits decoded by the lower bitplane decoding unit 404, thereby generating a decoded value C' (LL, x, y) of the coefficient C(LL, x, y). If U(LL, x, y) is 0, and at least one of the lower Tb bits is "1", the sign of the coefficient decoded by the lower bitplane decoding unit 404 is used as the sign of C' (LL, x, y).

The rectangular block combining unit 411 combines the respective blocks of the subband LL decoded by the bit shift unit 405 to decode the subband LL.

The inverse discrete wavelet transformation unit 412 decodes the data of the target frame by performing discrete wavelet transformation from the coefficient of the subband LL decoded by the rectangular block combining unit and the coefficients of subbands other than the subband LL which are decoded by the lower bitplane decoding unit.

The moving image data output unit 413 outputs the decoded image data output from the inverse discrete wavelet transformation unit 412 to the outside of the apparatus. Note that the moving image data output unit 413 can be realized by, for example, an interface with a network line or display device.

The decoding time measuring unit 414 measures, for each frame, a time Dt required between when one-frame data to be coded is read out and when the decoded frame data is output, and outputs the measured time to the non-decoding bitplane decision unit 403.

The non-decoding bitplane decision unit 403 decides the non-decoding bitplanes of each subband on the basis of the decoding time for one frame which is output from the decoding time measuring unit 414. The non-decoding bitplane decision unit 403 holds inside a variable Q (to be referred to as a "Q factor" hereinafter) which is an index value for the decision of a non-decoding bitplane count, a table indicating the non-decoding bitplane count of each subband in corresponding to each Q factor, a target decoding time T, and a time difference $\Delta T$:

$$\Delta T \leftarrow \Delta T + (T - Dt)$$

As described above, $\Delta T$ takes a value near "0" if the decoding time Dt for one frame is almost equal to the target decoding time T, and takes a negative value if the decoding time Dt for one frame exceeds the target decoding time T. If the decoding time Dt for one frame is shorter than the target decoding time T, $\Delta T$ takes a positive value. That is, $\Delta T$ can be regarded as an index value representing remaining power for processing.

FIG. 8 shows an example of a table representing the correspondence between the Q factor and the non-decoding bitplane count of each subband. Assume that in this case, the non-decoding bitplane count of the subband LL is a value which does not exceed Tb with every Q factor.

Referring to FIG. 8, setting "3" as a Q factor indicates the following.

subband LL: There is no non-decoding bitplane, i.e., all bitplanes are those to be decoded.

subbands HL1 & LH1: The code data of two upper bitplanes (bitplanes of bit 0 and bit 1) from the least significant bit to an upper bitplane are excluded from those to be decoded.

subband HH1: The code data of three bitplanes (bitplanes of bit 0, bit 1, and bit 2) from the least significant bitplane to an upper bitplane are excluded from those to be decoded.

subbands HL2 & LH2: The code data of three bitplanes (bitplanes of bit 0, bit 1, and bit 2) from the least significant bitplane to an upper bitplane are excluded from those to be decoded.

subband HH2: The code data of three bitplanes (bitplanes of bit 0, bit 1, and bit 2) from the least significant bitplane to an upper bitplane are excluded from those to be decoded.

As is easily understood from the above description and FIG. 8, a subband of a higher frequency component contains a larger number of bitplanes to be excluded from those to be decoded. This is because a subband of a lower frequency more dominates the quality of a playback image.

Figure 9:
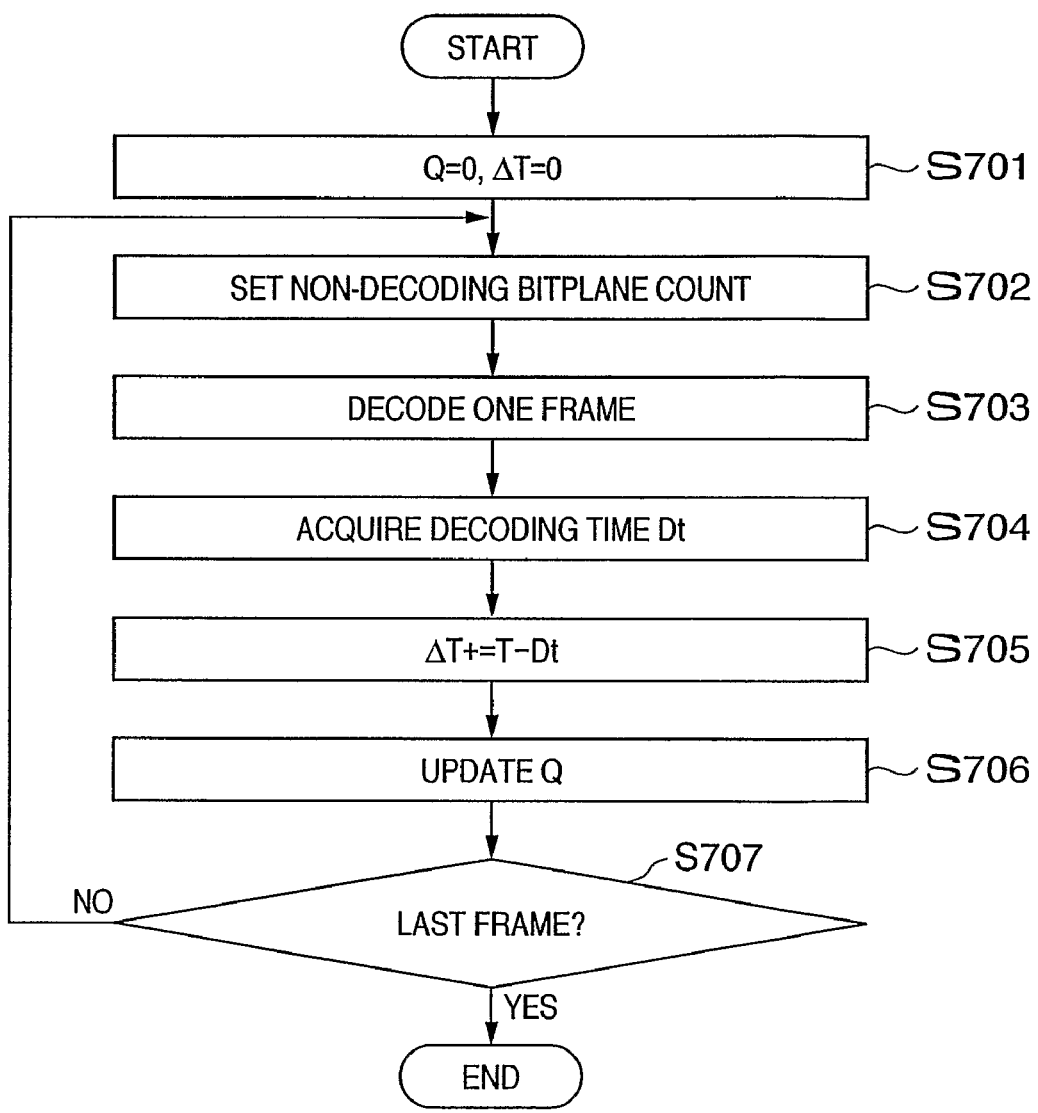
FIG. 9 is a flowchart showing the flow of processing in the moving image decoding apparatus according to the first embodiment.

FIG. 9 is a flowchart showing the flow of decoding processing for moving image code data by the moving decoding apparatus according to this embodiment. As shown in FIG. 9, first of all, the Q factor and time difference $\Delta T$ are reset to 0 before a decoding start point of moving image code data, i.e., the start of decoding of the code data of a frame 1 (step S701).

The non-decoding bitplane decision unit 403 then reads out the non-decoding bitplane count of each subband from the table on the basis of the Q factor, and sets it in the lower bitplane decoding unit 404 (step S702).

Subsequently, one frame is decoded by the processing by the units ranging from the code data input unit 401 to the inverse discrete wavelet transformation unit 412, and the frame data is output to the moving image data output unit 413 (step S703).

The decoding time measuring unit 414 measures the time Dt taken for the decoding processing for one frame performed in step S703, and transfers the measured time to the non-decoding bitplane decision unit 403 (step S704).

The non-decoding bitplane decision unit 403 obtains the difference between the target decoding time T for one frame and the actual decoding time Dt, and adds the difference to the held time difference $\Delta T$ (step S705). Assume that the target decoding time T for decoding the moving image data of a 30-sec frame is 1/30 sec.

The Q factor is then updated in accordance with the value of $\Delta T$ (step S706). If $\Delta T$ is larger than a predetermined threshold Uq (Uq>0) set in advance, since there is remaining power for decoding, 1 is subtracted from Q. As described above, $\Delta T$ becomes larger than the predetermined threshold, if the sum total of actual decoding times is smaller than the sum total of target times. In this case, in order to improve the decoded image quality, the value of Q is decreased to decrease the non-decoding bitplane count. If ΔT is smaller than a predetermined threshold Lq (Lq<0) set in advance, 1 is added to Q to increase its value. The value of ΔT becomes smaller than the predetermined threshold Lq when the sum total of actual decoding times is larger than the sum total of target times. In order to shorten the decoding time for one frame, the value of ΔT is increased to increase the non-decoding bitplane count. In this embodiment, since Q can take a value in the range of 0 to 9, if Q becomes smaller than 0 by the above update processing, Q is set to 0. If the value becomes larger than 9, Q is set to 9.

It is determined whether the frame subjected to decoding processing is the last frame. If the frame is not the last frame (NO), the flow shifts to step S702 to decode the next frame. If the frame is the last frame (YES), the decoding processing for the moving image code data is terminated (step S707).

The first embodiment has been described above. In the moving image coding apparatus of this embodiment, the range of application of motion compensation is limited to the upper bit portion of the subband LL. Even if, therefore, the range of transmission or decoding of code data of other portions is changed, as needed, in accordance with the state of a transmission path or the processing performance of the decoding apparatus, the influence of errors due to motion compensation on the decoded image quality of subsequent frames can be reduced. In addition, the coding efficiency can be improved by eliminating the redundancy between frames by motion compensation, and the transmission range or decoding range of moving image code data can be flexibly changed in accordance with the situation. In this embodiment, since a lossless filter is used for a wavelet transformation portion and no quantization processing is performed on the coding side, when all the bitplanes are decoded at the time of decoding, the original moving image code data can be reconstructed losslessly.

In this embodiment, subbands other than the subband LL are coded without being divided into rectangular blocks. However, it suffices if subbands other than the subband LL are coded after being divided into rectangular blocks. In addition, the lower bitplane coding unit 109 performs coding on a bitplane basis. As in international standard JPEG 2000, however, each bit of a bitplane may be divided into a plurality of categories in accordance with the state of adjacent coefficients, and may be coded separately in a plurality of scans.

In the above embodiment, motion compensation coding is performed for the subband LL. However, the subbands obtained by wavelet transformation may be classified into a group A (LL, HL1, LH1, and HH1) of relatively low-frequency components including the subband LL, and a group B (HL2, LH2, and HH2) of subbands of high-frequency components. Upper bits are extracted from each subband included in the group A, and is coded for each subband included in the group A on the basis of motion compensation. With regard to the lower bits of the subbands in the group A and the frequency component coefficients of the subbands in the group B, bitplanes may be mainly coded.

Furthermore, in the above embodiment, the shift bit count Tb represents the maximum number of bitplanes to be non-decoded on the decoding apparatus side. Assume that when the decoding apparatus is to determine non-decoding bitplanes of each subband according to a relationship like that shown in FIG. 8, the range of values which the Q factor can take in the decoding apparatus is 0 to 3, there is no need to perform the processing of obtaining LL components or upper bits of the subbands in the group A.

Under such conditions, a plurality of subbands obtained by wavelet transformation of one frame may be classified into two groups A and B, motion compensation may be performed for the respective subbands constituting the group A on the basis of the data of the subbands contained in the group A of the previous frame, and the subbands in the other group may be coded within a target frame. If, for example, the Q factor can take two values 0 an 1 as shown in FIG. 8, the group A may be constituted by LL, HL1, and LH1, and the group B may be constituted by HH1, HL2, LH2, and HH2.

In addition, the functions of some or all of the units of this embodiment may be described in software and processed by an arithmetic unit such as a CPU.

Second Embodiment

The first embodiment has exemplified the arrangement in which motion compensation is applied to only the upper bit portion of the subband LL. As described above, however, motion compensation may be applied to the upper bit portions of subbands other than the subband LL. In addition, in wavelet transformation, a lossless filter of an integer arithmetic type is used. If, however, lossless coding is not required, a real type filter may be used, and various kinds of quantization techniques can be used.

The second embodiment will exemplify an arrangement which applies motion compensation to all subbands and uses a real type filter and quantization.

Figure 7:
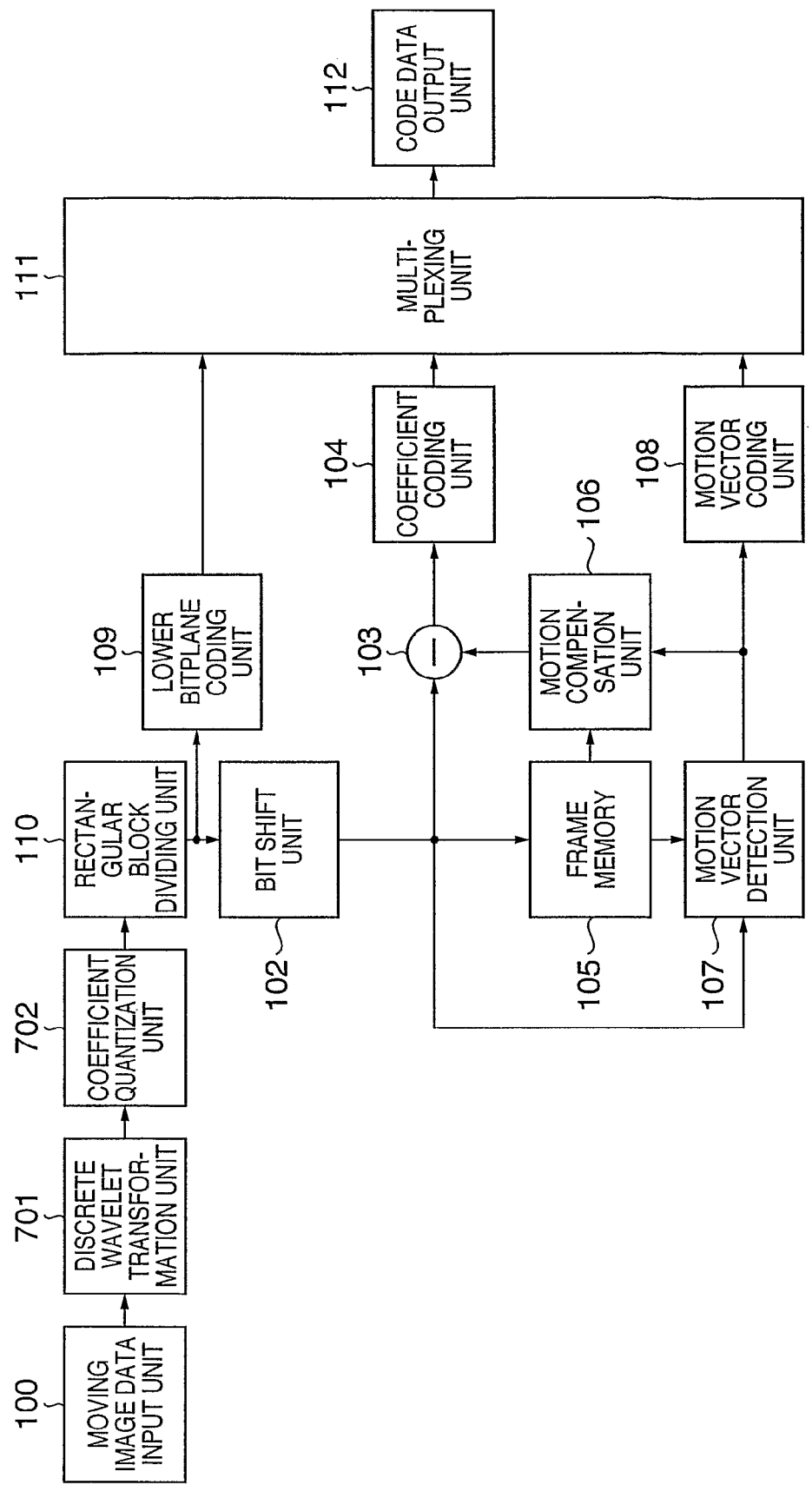
FIG. 7 is a block diagram showing the arrangement of a moving image coding apparatus according to the second embodiment.

FIG. 7 is a block diagram showing the arrangement of a moving image coding apparatus according to the second embodiment.

The same reference numerals as in FIG. 7 denote parts having the same functions as those in the first embodiment in FIG. 1 described above, and a description thereof will be omitted. Reference numeral 701 denotes a discrete wavelet transformation unit; and 702, a coefficient quantization unit.

Assume that in this embodiment as well, moving image code data similar to that in the first embodiment is coded.

Like the discrete wavelet transformation unit 101 in the first embodiment, the discrete wavelet transformation unit 701 performs two-dimensional discrete wavelet transformation for one-frame image data to be coded to decompose the data into seven subbands LL, HL1, LH1, HH1, HL2, LH2, and HH2.

The discrete wavelet transformation unit 101 performs one-dimensional wavelet transformation for N one-dimensional signals x(n) (where n is an integer from 0 to N−1) using an integer type 5×3 filter represented by:

$$h(n)=x(2n+1)-(x(2n)+x(2n+2))/2 \qquad (4)$$

$$l(n)=x(2n)+(h(n-1)+h(n))/4 \qquad (5)$$

where h(n) is a coefficient of a high-frequency subband, and l(n) is a coefficient of a low-frequency subband. Note that values x(n) at the two ends (n<0 and n>N−1) of a one-dimensional signal x(n) which are required for the calculation of equations (4) and (5) are obtained in advance from the value of the one-dimensional signal x(n) (n=0 to N−1) by a known method.

The coefficient quantization unit 702 quantizes a wavelet transformation coefficient C(Sb, x, y) generated by the discrete wavelet transformation unit 701 by using a quantization step delta(Sb) set for each subband. Letting Q(Sb, x, y) be a quantized coefficient value, the quantization processing performed by the coefficient quantization unit 702 can be represented by:

$$Q(Sb,x,y)= \\ sign\{C(Sb,x,y)\} \times floor\{\|C(Sb,x,y)\|/delta(Sb)\} \qquad (6)$$

where sign{I} is a function representing the sign of an integer I, which returns 1 when I is positive, and −1 when I is negative, and floor{R} is the maximum integral value that does not exceed a real number R.

The coefficient Q(Sb, x, y) of each subband which is quantized by the coefficient quantization unit 702 is similar to the coefficient C(Sb, x, y) of the subband LL in the first embodiment. A rectangular block dividing unit 110 divides this coefficient into rectangular blocks. A bit shift unit 102 generates an upper bit portion U(Sb, x, y). Motion compensation is performed for the upper bit portion U(Sb, x, y) by referring to the same subband in the immediately preceding frame, and a motion vector and prediction error are coded. Lower Tb bits rounded down by the bit shift unit 102 are coded by a lower bitplane coding unit 109. A frame memory 105 therefore has areas for storing all the subbands of two frames. Upper bit portions U(LL, x, y) of the subband coefficients of the immediately preceding frame are stored in one area, and those of the target frame are stored in the other area.

Figure 12:
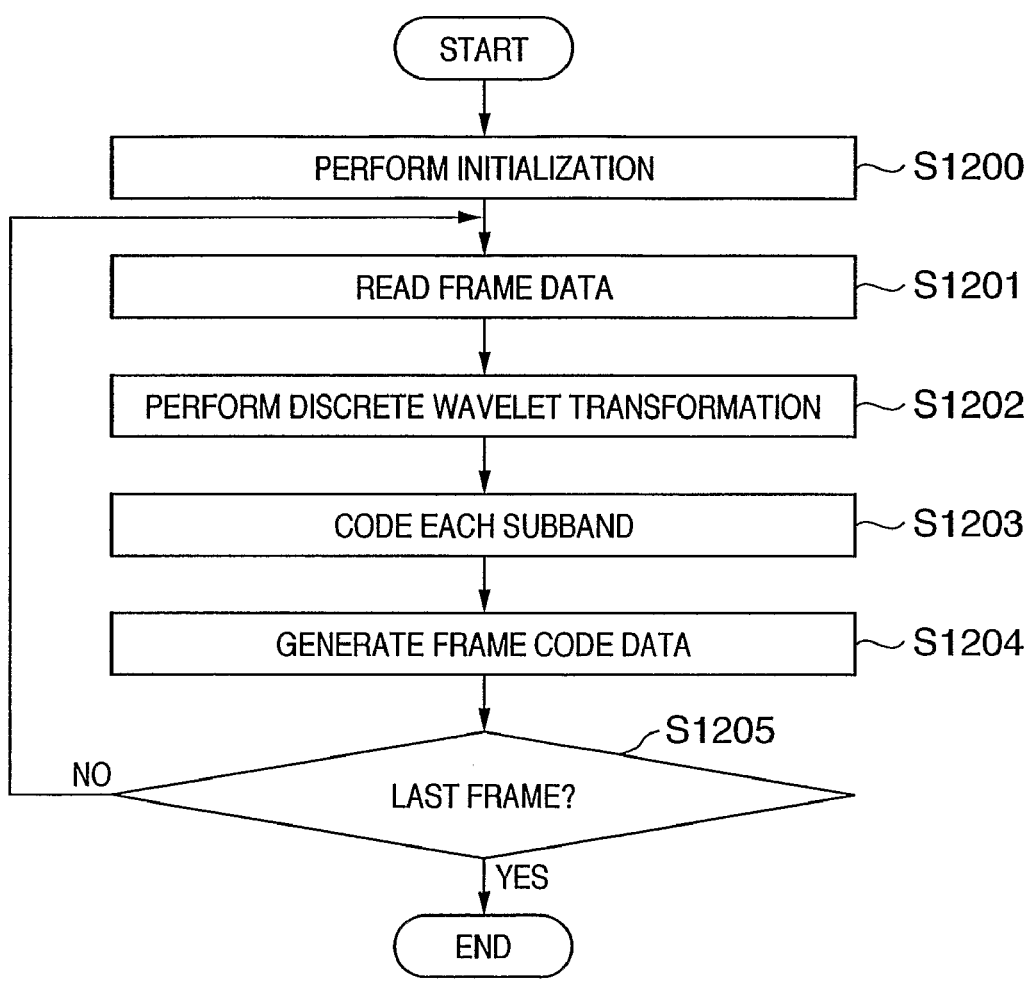
FIG. 12 is a flowchart showing the flow of processing in the moving image coding apparatus according to the second embodiment.

The flow of coding processing in this embodiment will be briefly described with reference to FIG. 12. The moving image coding apparatus of this embodiment performs initialization processing such as clearing the frame memory 105 before coding of a moving image to be coded (step S1200). A moving image data input unit 100 then reads one-frame image data and sends it to the discrete wavelet transformation unit 701 (step S1201). The discrete wavelet transformation unit 701 executes wavelet transformation for the frame data to be coded (step S1202). The rectangular block dividing unit 110, the bit shift unit 102, a subtracter 103, a motion vector detection unit 107, a motion compensation unit 106, a motion vector coding unit 108, a coefficient coding unit 104, and a lower bitplane coding unit 109 code the coefficient of each subband generated by the discrete wavelet transformation unit 701 (step S1203). The processing in step S1203 is equivalent to the processing in FIG. 13 in the first embodiment, which is further applied to subbands other than the subband LL, and a description thereof will be omitted. A multiplexing unit 111 combines code sequences obtained by the coefficient coding unit 104, motion vector coding unit 108, and lower bitplane coding unit 109 to form the code data of the frame (step S1204). It is determined whether or not the coded frame is the last frame (step S1205). If the coded frame is not the last frame, the flow returns to step S1201 to perform coding processing for the next frame data in the same manner. If the coded frame is the last frame, the code data output unit 112 finishes outputting the generated moving image code data, and the coding processing is terminated.

A moving image decoding apparatus of the second embodiment will be described next.

Figure 10:
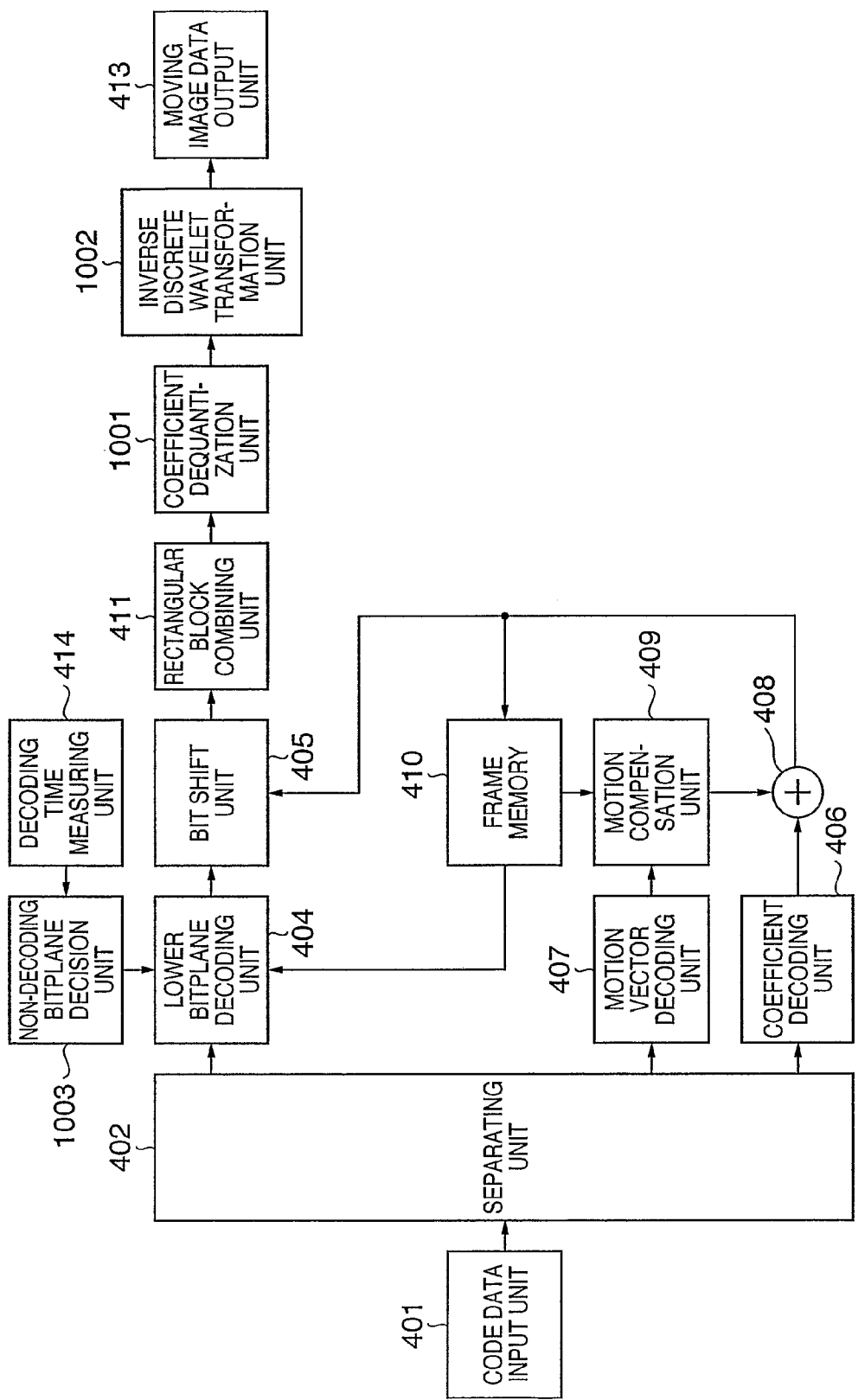
FIG. 10 is a block diagram showing the arrangement of a moving image decoding apparatus according to the second embodiment.

FIG. 10 is a block diagram showing the moving image decoding apparatus of the second embodiment. The same reference numerals as in FIG. 10 denote parts having the same functions as those of the respective blocks of the moving image decoding apparatus in FIG. 4 in the first embodiment, and a description thereof will be omitted. Reference numeral 1001 denotes a coefficient dequantization unit; 1002, an inverse discrete wavelet transformation unit; and 1003, a non-decoding bitplane decision unit.

In the moving image decoding apparatus of this embodiment, like the moving image decoding apparatus of the first embodiment, moving image code data to be decoded is input from a code data input unit 401. A separating unit 402 analyzes the structure of the code data, and sends motion vector code data to a motion vector decoding unit 407, coefficient code data to a coefficient decoding unit 406, and the lower bitplane code data of each subband to a lower bitplane decoding unit 404. The motion vector decoding unit 407, the coefficient decoding unit 406, a motion compensation unit 409, and an adder 408 decode the upper bit portion U(Sb, x, y) of the coefficient of a subband. The lower bitplane decoding unit 404 decodes the lower bits of the coefficient. A bit shift unit 405 reconstructs the quantized coefficient value Q(S, x, y). A rectangular block combining unit 411 combines the respective blocks constituting the subband to reconstruct the subband.

As in the first embodiment, the non-decoding bitplane decision unit 1003 designates a lower bitplane count ND(Sb) of bitplanes which are not decoded with respect to the lower bitplane decoding unit 404. The lower bitplane decoding unit 404 does not perform decoding processing for the number of lower bitplanes designated by the lower bitplane decoding unit 404.

The coefficient dequantization unit 1001 generates a reconstructed value C'(Sb, x, y) of the coefficient of each subband from the quantization step delta(Sb) set for each subband and the quantized coefficient value Q(Sb, x, y).

The inverse discrete wavelet transformation unit 1002 reconstructs the data of the target frame by performing transformation inverse to the transformation processing by the discrete wavelet transformation unit 701 with respect to the coefficient value C'(Sb, x, y) of each subband reconstructed by the coefficient dequantization unit 1001.

A decoding time measuring unit 414 measures a time Dt required between when the code data of each frame is read out and when the reconstructed frame data is output, and outputs the measured time to the non-decoding bitplane decision unit 1003.

The non-decoding bitplane decision unit 1003 decides the non-decoding bitplanes of each subband on the basis of the decoding time for one frame which is output from the decoding time measuring unit 414.

In the second embodiment, therefore, the non-decoding bitplane decision unit 1003 holds inside a variable ND( ) for the storage of the non-decoding bitplane count of each subband, a target decoding time T, a time difference ΔT, and an index variable SI for indexing each subband. Note that ND( ) without any specific description in the parentheses indicates all ND(0) to ND(6).

FIG. 19 shows the relationship between the subband indexes and the subbands. As shown in FIG. 19, a smaller subband index value indicates the subband of a lower frequency component. Note that information is described in the parentheses of the non-decoding bitplane count ND( ) in two notations, i.e., one using the subband index SI and the other using the subband Sb. This is only the difference in notation, and there is a correspondence based on the relationship shown in FIG. 19. For example, the subband index of the subband LL is 6, and both ND(LL) and ND(6) indicate the non-decoding bitplane count of the subband LL.

An outline of decoding processing in the second embodiment will be described below.

First of all, the variable ND( ) indicating the non-decoding bitplane count of each subband is cleared to 0, and the index variable SI indicating a subband to be updated is cleared to 0. If the load of decoding processing on the processor or the like is heavy, ND(SI) is incremented by "1", and SI is incremented by "1". Since ND( )=0 and SI=0 in the initial state, ND(0)=1 is set as a result of the above processing. As a consequence, the non-decoding bitplane count of the subband HH2 is set to "1". In decoding processing for the next frame, if the state remains unchanged, ND(SI)=ND(1)=1, and the non-decoding bitplane count of the subband LH2 is set to "1". In this manner, when the load is heavy, ND(SI) is incremented by "1", and the subband index SI is also incremented.

FIG. 16 shows how the non-decoding bitplane count of each subband is set when subband index SI=4.

When the load required for decoding processing is heavy, the subband index SI is incremented in the above manner. If SI=7, the subband index is returned to SI=0 to make preparations to further increase the non-decoding bitplane count of a high-frequency component.

When the target decoding time T becomes shorter than the time Dt required for actual decoding processing, it indicates that the load has decreased. Therefore, the subband index SI is decremented, and ND(SI) indicated by SI after updating is decremented by "1". If SI becomes "−1", the subband index is set to SI=6. Note that ND( ) does not become smaller than 0.

Figure 17:
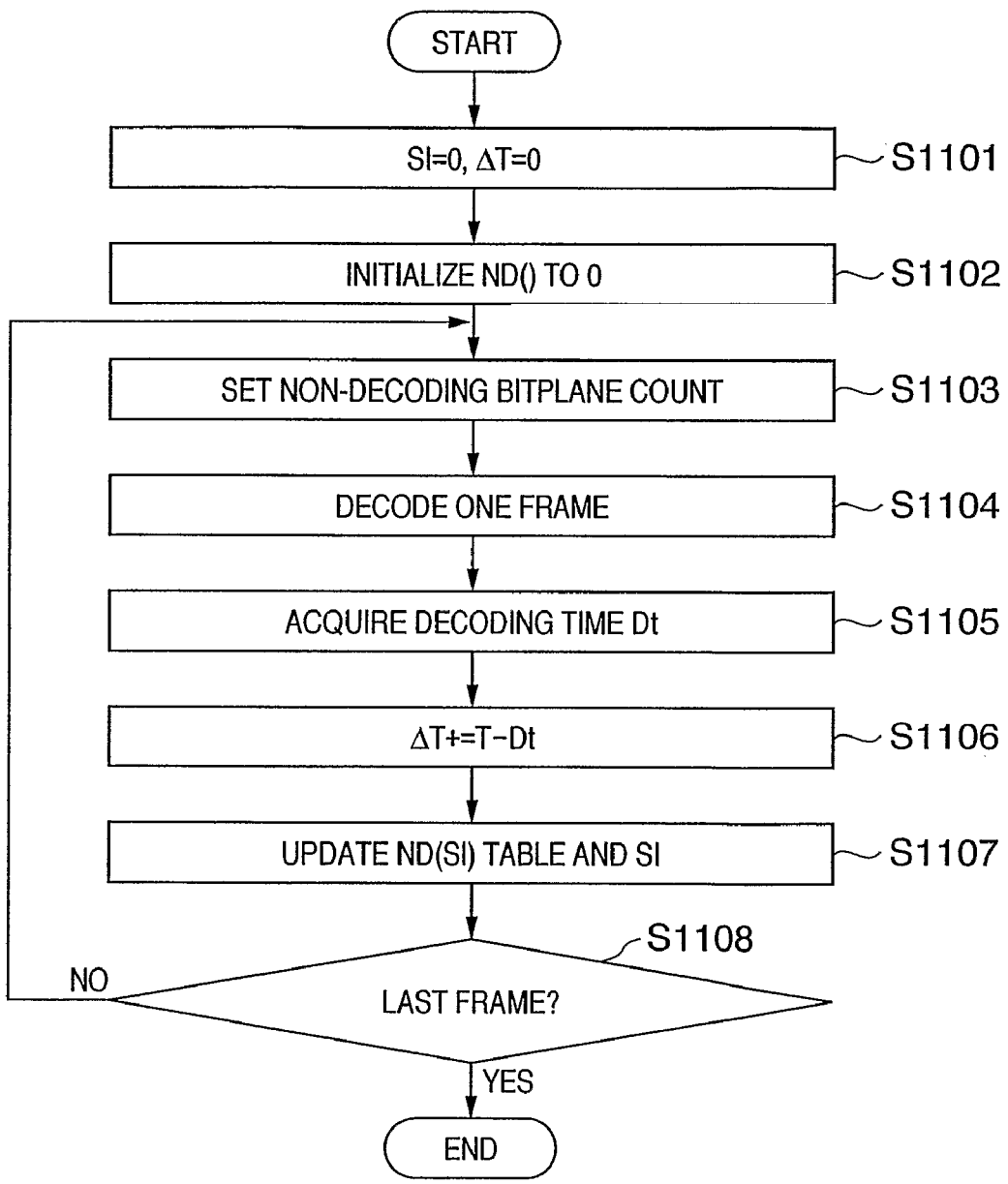
FIG. 17 is a flowchart showing the flow of processing in the moving image decoding apparatus according to the second embodiment.

Specific decoding processing in the second embodiment will be described with reference to the flowchart of FIG. 17.

First of all, in step S1101, before decoding of moving image code data is started, i.e., decoding of the code data of a frame f1 is started, the subband index SI and time difference $\Delta T$ are reset to 0 (step S1101).

All the non-decoding bitplane counts ND(0), ND(1), . . . , ND(6) of the respective subbands which are held in the non-decoding bitplane decision unit 1003 are initialized to 0 (step S1102).

The non-decoding bitplane counts ND(0) to ND(6) stored in the non-decoding bitplane decision unit 1003 are read out and set in the lower bitplane decoding unit 404 (step S1103).

One frame is then decoded by the processing performed by the units ranging from the code data input unit 401 to the non-decoding bitplane decision unit 1003, and the frame data is output to the moving image data output unit 413 (step S1104).

The decoding time measuring unit 414 measures the time Dt taken for the decoding processing for one frame in step S1104, and transfers the measured time to the non-decoding bitplane decision unit 1003 (step S1105).

The non-decoding bitplane decision unit 1003 obtains the difference (=T−Dt) between the target decoding time T for one frame and the actual decoding time Dt, and cumulatively adds the difference to the held time difference $\Delta T$ (step S1106):

$$\Delta T \leftarrow \Delta T + (T-Dt)$$

In step S1107, the table holding the non-decoding bitplane count ND( ) and the subband index SI are updated in accordance with the value of $\Delta T$.

The processing in step S1103 and the subsequent steps is repeated until the last frame is processed.

Figure 18:
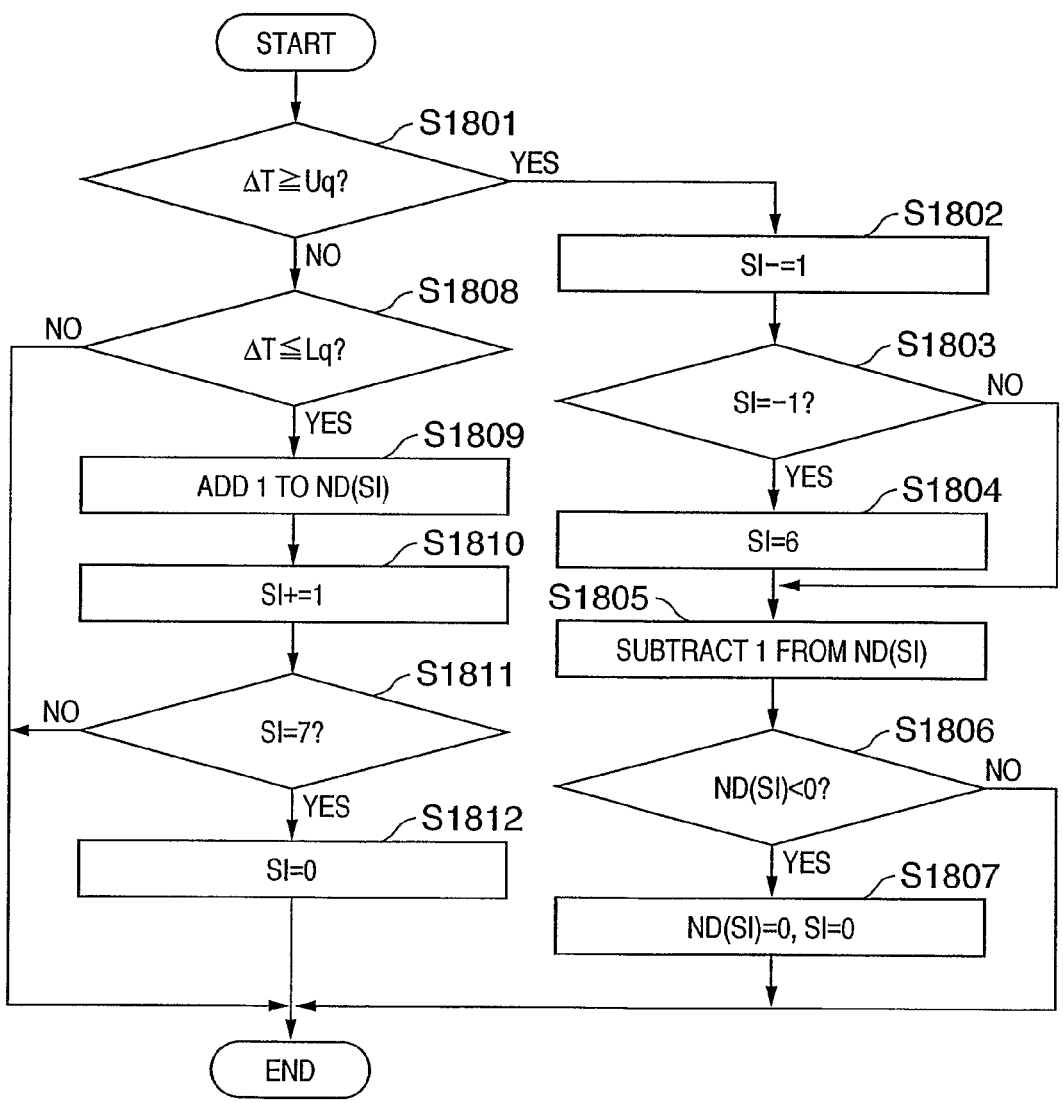
FIG. 18 is a flowchart showing the processing in step S1107 in FIG. 17.
Figure 20:
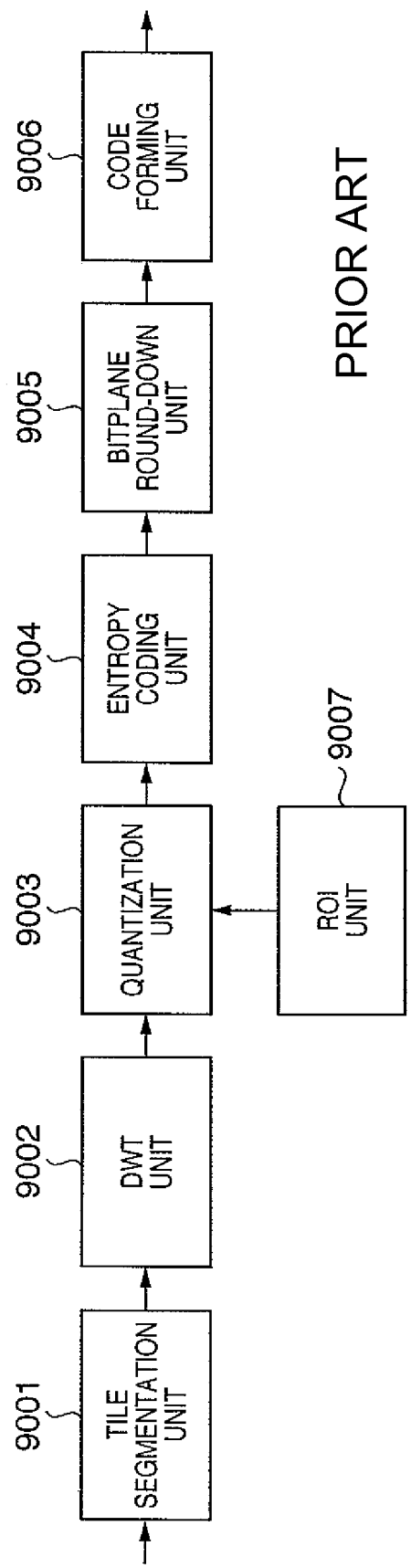
FIG. 20 is a block diagram showing a coding sequence based on the JPEG 2000 coding scheme.
Figure 21:
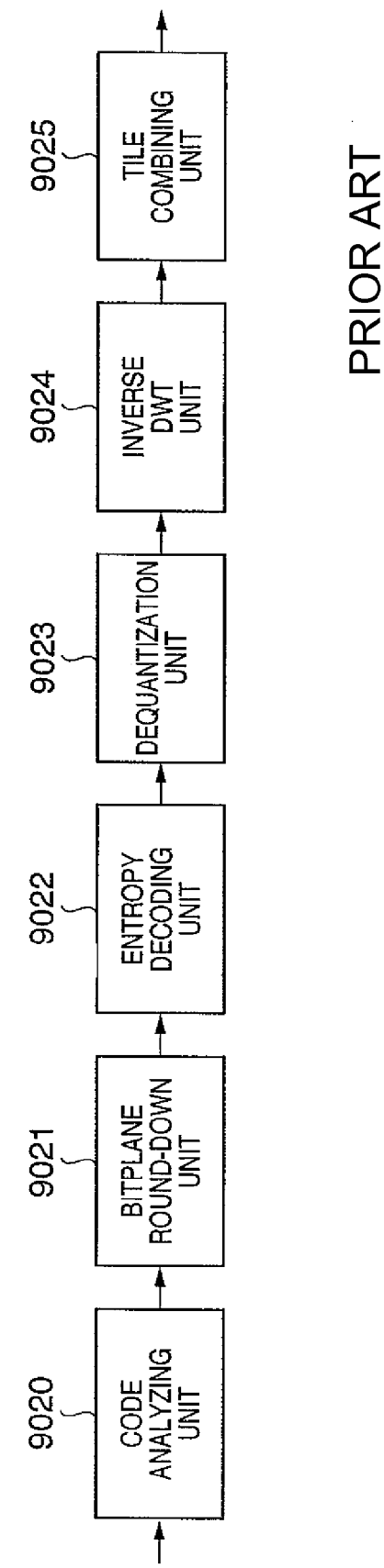
FIG. 21 is a block diagram showing a decoding sequence based on the JPEG 2000 coding scheme.
Figure 22:
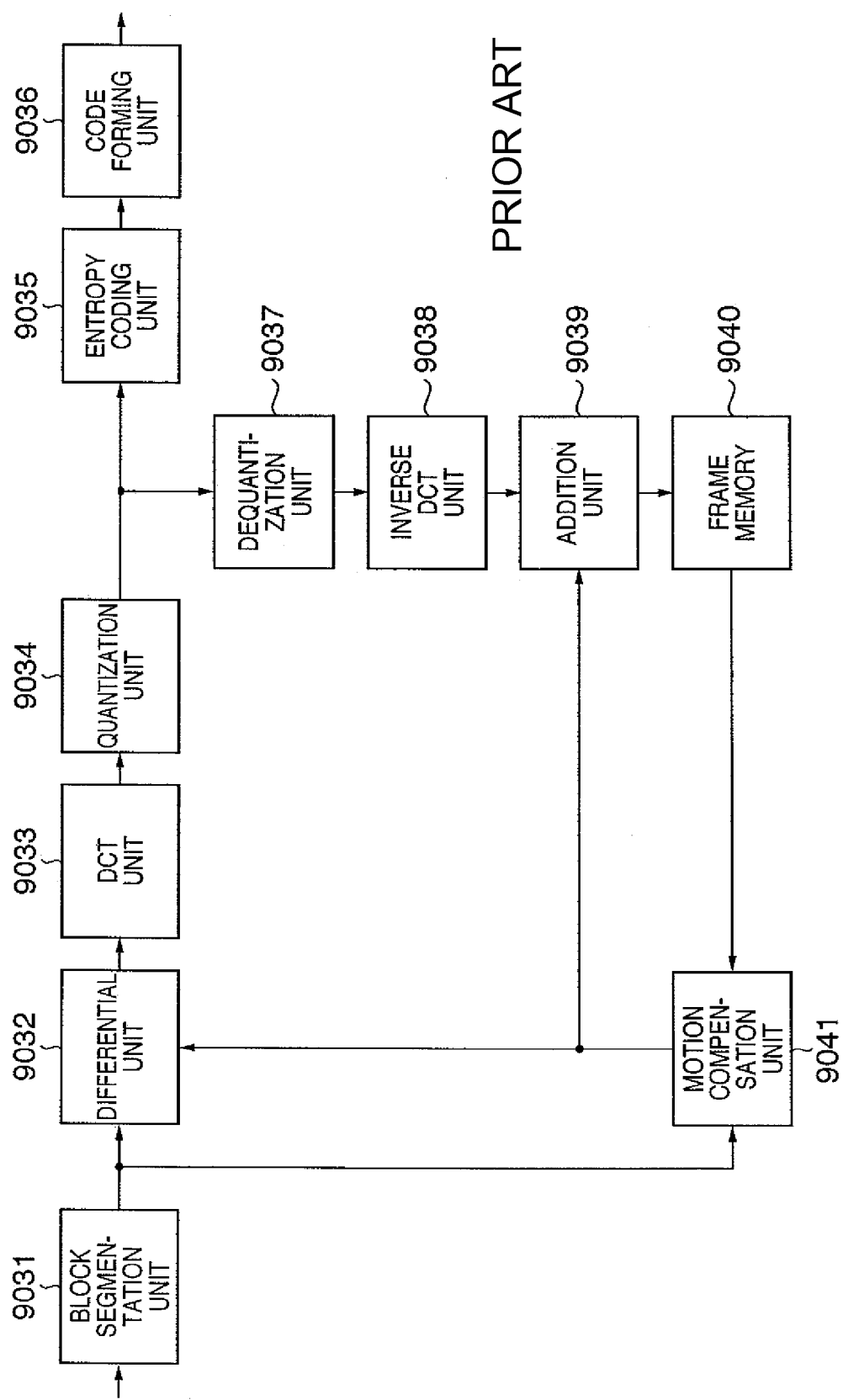
FIG. 22 is a block diagram sowing a coding sequence based on the MPEG coding scheme.

The details of the processing in step S1107 will be described below with reference to the flowchart of FIG. 18.

It is determined whether or not $\Delta T$ is larger than a predetermined threshold Uq (Uq>0) set in advance (step S1801). If $\Delta T$ is larger than the threshold (YES), since it indicates that the decoding time is shorter than the target time, the subband index variable SI is decremented by "1" (step S1802).

It is determined in step S1803 whether or not the variable SI is "−1" (step S1803). If the variable is "−1", "6" is substituted into the variable SI (step S1804). The non-decoding bitplane count ND(SI) of the subband corresponding to the subband index variable SI is decremented by "1" (step S1805). Note that $\Delta T$ becomes larger than the predetermined threshold when the sum total of actual decoding times is shorter than the sum total of target times. It is therefore preferable to improve the decoded image quality by decreasing the non-decoding bitplane count in accordance with the remaining power.

Note that since ND( ) is not allowed to be smaller than 0, it is determined in step S1806 whether or not ND(SI) is smaller than "0". If ND(SI) becomes smaller than 0, ND(SI) is set to "0" and the index variable is set to SI=0 in step S1807 (step S1807).

If it is determined as a result of comparison in step S1801 that $\Delta T \leq Uq$ (NO), the flow advances to step S1808 to compare $\Delta T$ with a predetermined threshold Lq (Lq<0) set in advance.

If $\Delta T > Lq$ (NO), since it indicates that the current decoding processing falls within an allowable range with respect to the target decoding time T, this processing is terminated without any change in the index variable SI and the non-decoding bitplane count.

If it is determined in step S1808 that $\Delta T \leq Lq$, the flow advances to step S1809 to increment ND(SI) by "1". Since $\Delta T$ becomes smaller than the predetermined threshold when the sum total of actual decoding times is longer than the sum total of target times, the decoding time for one frame is shortened by increasing the non-decoding bitplane count. In step S1810, the index variable SI is also incremented by "1".

In this embodiment, seven subbands are generated by performing wavelet transformation twice. Since the numbers 0 to 6 are assigned to the indexes of the respective subbands, the index variable SI is not allowed to be larger than 7.

If it is determined as a result of comparison between the variable SI and "7" that SI=7 (YES), the variable SI is set to 0 in step S1812.

With the above processing, when $\Delta T$ is larger than the predetermined value or smaller than the predetermined value, the non-decoding bitplane count ND( ) of one subband can be changed one by one. Note, however, that the non-decoding bitplane count ND( ) is not allowed to exceed Tb.

The moving image coding apparatus of the second embodiment applies motion compensation to the upper bit portions of the coefficients of subbands other than the subband LL so as to improve the coding efficiency as compared with the first embodiment. In this embodiment, as in the first embodiment, even if the transmission or decoding range of lower bit portions is changed as needed in accordance with the state of a transmission path or the processing performance of the decoding apparatus, errors due to motion compensation exert no influence on the decoded image quality of subsequent frames. Therefore, the coding efficiency can be improved by eliminating the redundancy between frames by motion compensation, and the transmission range or decoding range of moving image code data can be flexibly changed in accordance with the situation. In this embodiment, wavelet transformation coefficients are quantized by using the quantization step delta(Sb) set for each subband. This makes it possible to reduce the code amount of moving image code data as compared with the first embodiment.

Third Embodiment

Although there has been no mention about the adjustment of the overall code amount of moving image code data to be output in the moving image coding apparatuses according to the first and second embodiments described above, the generated code amount can be easily controlled by adjusting the range of lower bitplanes to be coded. The third embodiment will exemplify a case wherein an overall code amount is adjusted.

Figure 11:
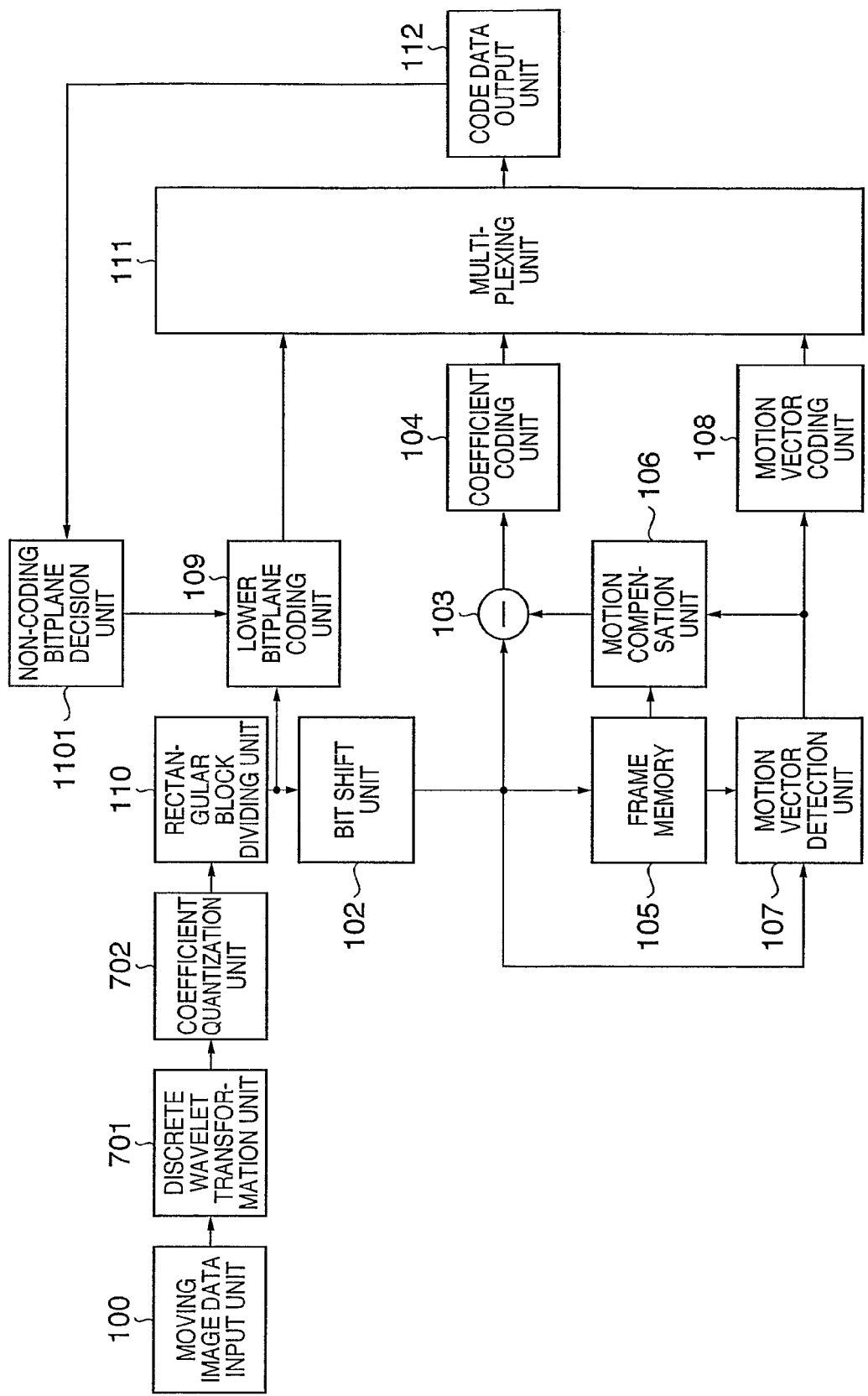
FIG. 11 is a block diagram showing the arrangement of a moving image coding apparatus according to the third embodiment.

FIG. 11 is a block diagram showing the arrangement of a moving image coding apparatus according to the third embodiment. The moving image coding apparatus of the third embodiment has an arrangement obtained by adding a non-coding bitplane decision unit 1101 to the moving image coding apparatus of the second embodiment shown in FIG. 7. Differences in operation from the moving image coding apparatus of the second embodiment will be described below.

A lower bitplane coding unit 109 codes the lower Tb bits of each subband as in the moving image coding apparatus of the second embodiment. In this case, the non-coding bitplane decision unit 1101 sets the number of lower bitplanes which are not to be coded, i.e., a non-coding bitplane count NE(Sb), and the lower bitplane coding unit 109 does not code the lower NE(Sb) bitplanes of a coefficient.

The non-coding bitplane decision unit 1101 adjusts the overall generated code amount by increasing/decreasing the non-coding bitplane count NE(Sb) for each subband from the generated code amount of a coded frame. Assume that the value of the non-coding bitplane count NE(Sb) does not exceed Tb (indicating a lower bit count). The non-coding bitplane count NE(Sb) can be adjusted by the same method as that used to adjust the non-decoding bitplane count ND(Sb) in accordance with the decoding time in the moving image decoding apparatuses according to the first and second embodiments.

A condition parameter for adjustment in this case is not time but is set as follows. The following is a case wherein the Q factor in the first embodiment is used.

Letting Vs be a target code data amount for one frame, and Vc be the code amount of the immediately preceding frame, a difference Vt is obtained as follows:

$$Vt \leftarrow Vt+(Vs-Vc)$$

If Vt is larger than a positive threshold T1, the Q factor is decremented by "1" (note, however, that the Q factor should not be reduced below 0). If Vt becomes smaller than a negative threshold T2, the Q factor is incremented by "1" (note, however, that the Q factor is not allowed to exceed "9" according to the example shown in FIG. 8).

In order to comply with the second embodiment, NE(Sb) may be adjusted by comparing Vt with T1 and T2, and changing the index SI.

As described above, in the moving image coding apparatus of this embodiment, as in the first and second embodiments, the transmission or decoding range of the code data of lower bit portions can be changed as needed in accordance with the state of a transmission path or the processing performance of the decoding apparatus. In addition, the overall code amount of moving image code data can be adjusted by properly adjusting the non-coding bitplane count NE(Sb) using the non-coding bitplane decision unit.

The moving image coding apparatus of this embodiment has exemplified the arrangement configured not to code predetermined lower bits by setting a non-coding bitplane count. However, control of a code amount can be realized by rounding down coded bitplanes (discarding bitplanes without outputting them).

Fourth Embodiment

The second embodiment has exemplified the case wherein the coefficients of all subbands are regarded as targets for motion compensation, and motion compensation is applied to upper bit portions. According to the description of the second embodiment, a coefficient is separated into an upper bit portion and a lower bit portion on the basis of the bit position indicated by the fixed threshold Tb. However, the quality of an image played back by an upper bit portion can be improved by setting the threshold Tb for each subband in accordance with the degree of importance of each subband coefficient with respect to objective and subjective image qualities.

The fourth embodiment will exemplify a case wherein a threshold TB(Sb) is individually set for each subband, and each coefficient is separated into an upper bit portion and a lower bit portion by using this threshold.

Figure 23:
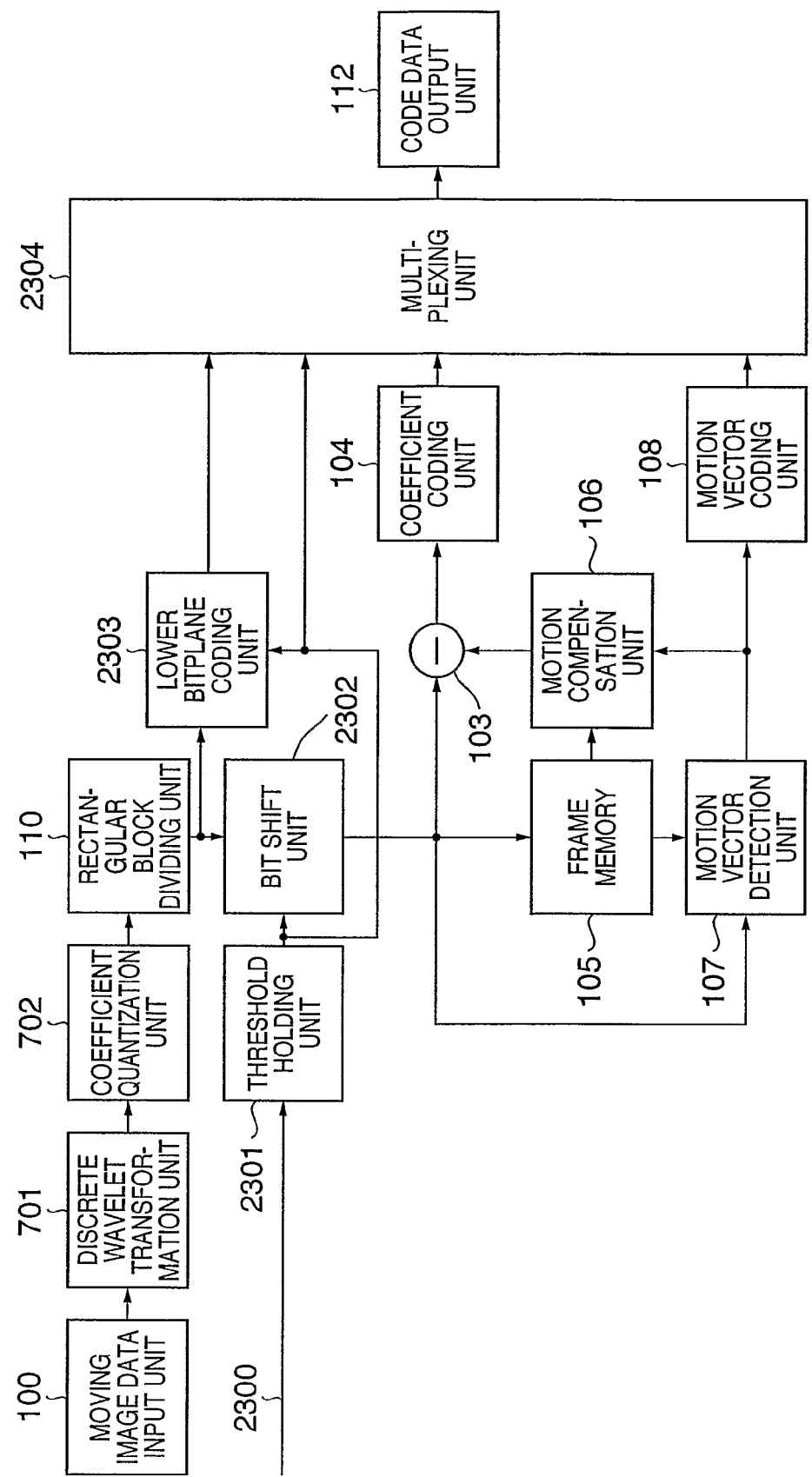
FIG. 23 is a block diagram showing the arrangement of a moving image coding apparatus according to the fourth embodiment.

FIG. 23 is a block diagram showing the arrangement of a moving image coding apparatus according to the fourth embodiment. The same reference numerals as in FIG. 23 denote parts having the same functions as those in the first and second embodiments in FIGS. 1 and 7 described above, and a description thereof will be omitted. Reference numeral 2300 denotes a signal line; 2301, a threshold holding unit; 2302, a bit shift unit; 2303, a lower bitplane coding unit; and 2304, a multiplexing unit.

In this embodiment as well, moving image code data similar to that in the first and second embodiments is coded.

In the moving image coding apparatus of this embodiment, before coding processing, the threshold TB(Sb) for separating the coefficient of each subband Sb into an upper bit portion and a lower bit portion is input from outside the apparatus through the signal line 2300, and held in the threshold holding unit 2301. Assume that thresholds TB(Sb) like those shown in FIG. 24 are set.

The bit shift unit 2302 extracts an upper bit portion U(Sb, x, y) of a coefficient Q(Sb, x, y) of each subband quantized and input from a rectangular block dividing unit 110 by shifting the coefficient to the right by the threshold TB(Sb) stored in the threshold holding unit 2301 (equivalent to quantization (division) by a quantization step $2^{TB(sb)}$). The bit shift processing performed by the bit shift unit 2302 is the same as the bit shift processing performed by the bit shift unit 102 described in the first embodiment. Note that if TB(SB) in FIG. 24 is set in the threshold holding unit 2301, since TB(LL) is 0, no bit shift is performed for the coefficient of a subband LL.

With regard to the information of the lower TB(SB) bits of the coefficient Q(Sb, x, y) of each subband which is lost by the bit shift processing (quantization processing) performed by the bit shift unit 2302, the lower bitplane coding unit 2303 codes the respective bitplanes from bit 0 which is the LSB to bit TB(Sb)–1 on a bitplane basis. Like the lower bitplane coding unit 109 in the first embodiment, the lower bitplane coding unit 2303 codes the bitplanes from the bitplane of the upper bit TB(Sb)–1 to the bitplane of the LSB. When TB(Sb) in FIG. 24 is given, since TB(LL) for the subband LL is 0, the lower bitplane coding unit 2303 does not code the bitplane.

The multiplexing unit 2304 combines code sequences output from a motion vector coding unit 108, a coefficient coding unit 104, and the lower bitplane coding unit 2303 and the threshold TB(Sb) stored in the threshold holding unit 2301 while storing them in an internal buffer (not shown), and adds, as a header, various kinds of information necessary for decoding to the combined information, thereby forming a final code sequence to be output from the moving image coding apparatus of this embodiment. The arrangement of the final code sequence generated by the multiplexing unit 2304 is basically the same as that of the code sequence generated by the multiplexing unit 111 described in the first embodiment, and differs in that the threshold TB(Sb) stored in the threshold holding unit 2301 is set in the header and transmitted.

Although the differences between the moving image coding apparatus of the fourth embodiment and those of the first and second embodiments have been described above, the basic flow of processing is the same as that described in the second embodiment described with reference to FIG. 12. Note, however, that the processing of setting the threshold TB(Sb) in the threshold holding unit 2301 is added to the initialization processing performed in step S1200.

A moving image decoding apparatus according to the fourth embodiment will be described next.

Figure 25:
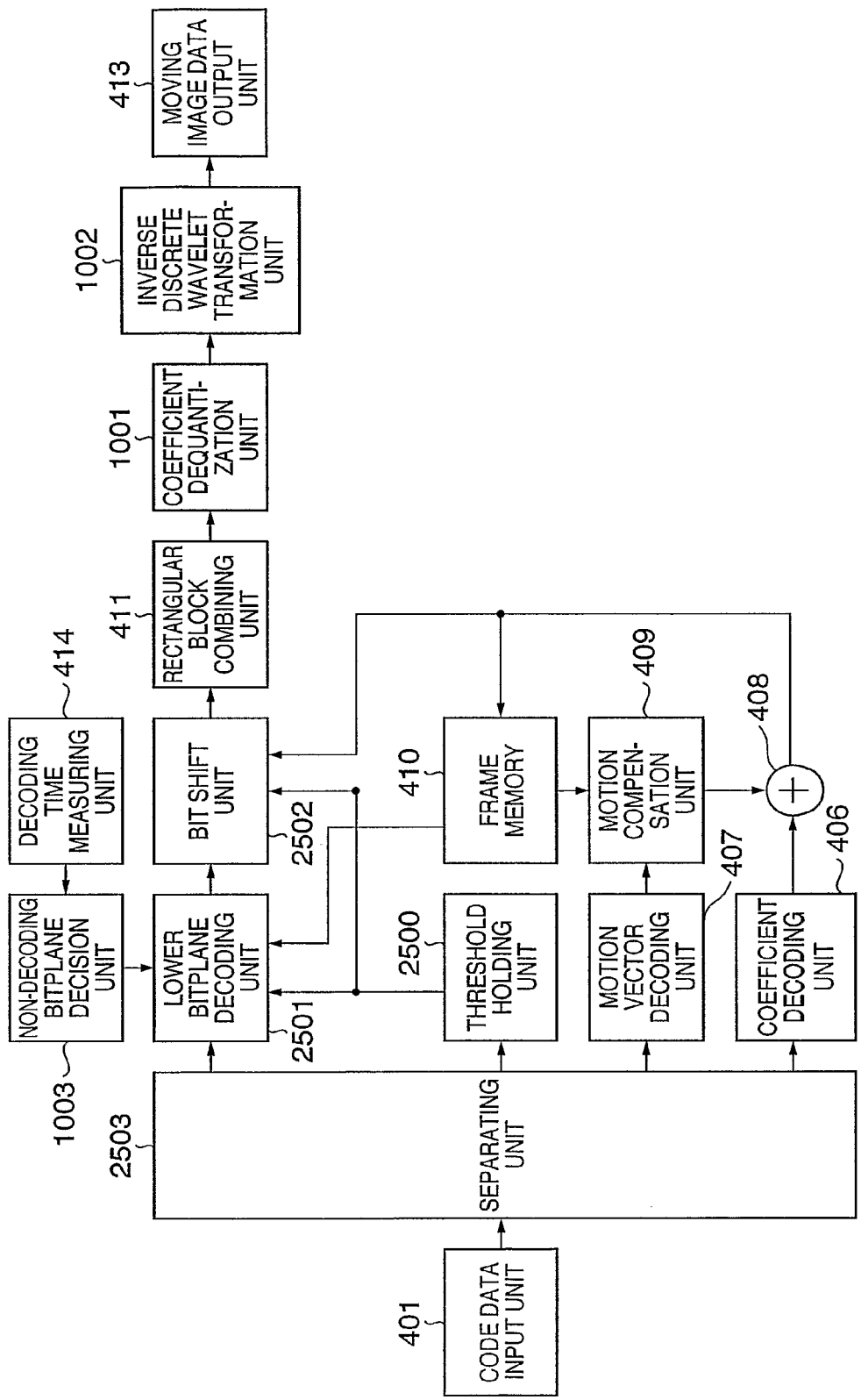
FIG. 25 is a block diagram showing the arrangement of a moving image decoding apparatus according to the fourth embodiment.

FIG. 25 is a block diagram showing a moving image decoding apparatus according to the fourth embodiment. The same reference numerals as in FIG. 25 denote parts having the same functions as those of the respective blocks of the moving image decoding apparatus in FIG. 11 in the second embodiment, and a description thereof will be omitted. Reference numeral 2500 denotes a threshold holding unit; 2501, a lower bitplane decoding unit; 2502, a bit shift unit; and 2503, a separating unit.

In the moving image decoding apparatus of the fourth embodiment, as in the moving image decoding apparatuses of the first and second embodiments, moving image code data to be decoded is input from a code data input unit 401, and the separating unit 2503 analyzes the structure of the code data to send motion vector code data to a motion vector decoding unit 407, coefficient code data to a coefficient decoding unit 406, and the lower bitplane code data of the coefficient of each subband to the lower bitplane decoding unit 2501. In this embodiment, a threshold TB(Sb) is also extracted from the header and stored in the threshold holding unit 2500. With this operation, a table of thresholds TB(Sb) like that shown in FIG. 24 is held in the threshold holding unit 2500.

The lower bitplane decoding unit 2501 and bit shift unit 2502 read out the threshold TB(Sb) from the threshold holding unit 2500 in accordance with the target subband Sb to be decoded. This threshold is used for processes performed by the respective units.

Like the lower bitplane decoding unit 404 in the first embodiment, the lower bitplane decoding unit 2501 decodes the bitplane code data generated by the lower bitplane coding unit 2303. Note that the lower TB(Sb) bits of the coefficient of each subband are decoded by referring to the upper bit portion U(Sb, x, y) of the coefficient stored in a frame memory 410, as needed. When the threshold TB(Sb) like that shown in FIG. 24 is to be used, since TB(LL) is 0, the whole coefficient of the subband LL is decoded by the coefficient decoding unit 406, and the number of bitplanes to be decoded by the lower bitplane decoding unit 2501 becomes 0. In addition, when a non-decoding bitplane count ND(Sb) supplied from the non-decoding bitplane decision unit 1003 is larger than TB(Sb), the number of bitplanes to be decoded by the lower bitplane decoding unit 2501 is 0.

The bit shift unit 2502 shifts reconstructed U(Sb, x, y) to the left (in the upper bit direction) by the TB(Sb) bits and combines the lower TB(Sb) bit portion with the information of the lower TB(Sb) bit portion decoded by the lower bitplane decoding unit 2501, thereby generating the reconstructed value of the quantized coefficient Q(Sb, x, y). If U(Sb, x, y) is 0 and at least one of the lower TB(Sb) bits is "1", the sign of the coefficient decoded by the lower bitplane decoding unit 2501 is used as the sign of Q(Sb, x, y).

The flow of decoding processing in the fourth embodiment is basically the same as the moving image decoding processing in the second embodiment, but differs in that when one frame is to be decoded in step S1104, the threshold TB(Sb) must be extracted by analyzing the header of the moving image code data at the timing in, for example, step S1101, and must be stored in the threshold holding unit 2500.

As described above, in the moving image coding apparatus of the fourth embodiment, the threshold TB(Sb) is set for each subband, a coefficient is separated into an upper bit portion and a lower bit portion by using the threshold, and motion compensation is applied to only the upper bit portion. According to this embodiment, the image quality of an image played back by decoding only a bit portion in the motion compensation application range, i.e., the upper bit portion of each subband, can be adjusted. For example, the subjective and objective image qualities can be improved by properly combining the subband quantization step delta(Sb) and the threshold TB(Sb). For example, as shown in FIG. 24, no lower bit portion may be set for the subband LL which exert great influence on image quality, and motion compensation may be applied to the whole subband LL. In this embodiment, as in the first and second embodiments, even if the transmission or decoding range of the code data of lower bit portions is changed as needed in accordance with the state of a transmission path or the processing performance of the decoding apparatus, errors due to motion compensation exert no influence on the decoded image quality of subsequent frames. Therefore, the coding efficiency can be improved by eliminating the redundancy between frames by motion compensation, and the transmission range or decoding range of moving image code data can be flexibly changed in accordance with the situation.

Other Embodiment

The present invention is not limited to the above embodiments. In the above embodiments, discrete wavelet transformation is performed for each frame, i.e., one frame is handled as one tile. However, one frame may be divided into a plurality of tiles, and the above processing may be applied to each tile. In addition, when bitplanes are to be coded, each bitplane may be coded in a plurality of passes.

In addition, a filter for subband decomposition is not limited to the one described in the above embodiments, and other types of filters such as a real type 9×7 filter may be used. The number of times such filter is applied is not limited to that in the above embodiments. In the above embodiments, one-dimensional discrete wavelet transformation is performed the same number of times in the horizontal direction and the vertical direction. However, such transformation need not be performed the same number of times.

In addition, the structure of moving image code data is not limited to that in the above embodiments, and the order of code sequences, the storage form of additional information, and the like may be changed. Furthermore, the measurement of a decoding time is not limited to the form in the above embodiments. For example, it may be estimated that wavelet transformation or the like requires an almost constant processing time, and only the time taken for bitplane decoding may be measured. Alternatively, a processing time may be measured for every a plurality of frames to control a non-decoding portion.

In the above embodiments, motion compensation is performed by referring to only the immediately preceding frame. However, the present invention is not limited to this. Prediction may be performed by referring to another frame or a plurality of frames.

Obviously, as in a general moving image coding scheme, code data (I-frame) which is coded independently may be inserted at proper intervals without referring to other frames.

The present invention may be applied to a system constituted by a plurality of devices (e.g., a host computer, interface device, reader, printer, and the like) or an apparatus comprising a single device (e.g., a copying machine, facsimile apparatus, or the like).

The object of the present invention is realized even by supplying a storage medium (or a recording medium) storing software program codes for realizing the functions of the above-described embodiments to a system or apparatus, and causing the computer (or a CPU or MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the operating system (OS) running on the computer performs part or all of actual processing on the basis of the instructions of the program codes. As a storage medium storing the program codes, a flexible disk, hard disk, ROM, RAM, magnetic tape, nonvolatile memory card, CD-ROM, CD-R, DVD, optical disk, magnetooptical disk, MO, or the like can be used.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is to be applied to the above storage medium, program codes corresponding to the flowcharts described above are stored in the storage medium.

As has been described above, according to the present invention, the technique of decomposing each frame constituting a moving image into subbands having different frequency component data by wavelet transformation or the like can be used, while code data can be generated, which suppresses redundancy between frames and maintains quality that can endure decoding processing in accordance with the situation such as the processing performance on the decoding apparatus side.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2004-071400 filed on Mar. 12, 2004 and 2005-013032 filed on Jan. 20, 2005, which are hereby incorporated by reference herein.

The invention claimed is:

1. A moving image coding apparatus which codes time series frames constituting moving image data, comprising:
    a decomposition unit that decomposes a current frame into a plurality of subbands having different frequency components;
    a first extraction unit that, with a threshold set for each subband being represented by TB, extracts data of upper bits as motion compensation target data which excludes lower TB bits of frequency component coefficient data constituting each subband;
    a second extraction unit that extracts data of lower TB bits of the frequency component coefficient data constituting each subband as non motion compensation target data;
    a motion compensation unit that generates motion vector information and predicted value information on the basis of motion compensation target data of the current frame extracted by said first extraction unit and decoded data corresponding to the motion compensation target data obtained when a preceding frame is coded;
    a first coding unit that obtains a difference value between predicted value information generated by said motion compensation unit and the motion compensation target data in the current frame and coding the difference value and the motion vector information;
    a second coding unit that encodes, in units of bitplanes, data of the lower TB bits of each frequency component coefficient data extracted by said second extraction unit;
    a multiplexing unit that multiplexes code data obtained by said first coding unit and said second coding unit; and
    a decision unit that detects the code data amount of the current frame multiplexed by said multiplexing unit and decides a number of bitplanes not to be encoded for the subsequent frame, the decision unit comprising a processor,
    wherein said second coding unit encodes bitplanes of data of the lower TB bits excluding the number of bitplanes, from a lowest bit plane, decided by said decision unit when the preceding frame had been encoded.

2. The apparatus according to claim 1, wherein said decomposition unit comprises a unit that decomposes a frame into a plurality of subbands on the basis of a discrete wavelet transformation method.

3. The apparatus according to claim 1, wherein the threshold set for each subband and being represented by TB is set for each subband to be 0 for subbands of low frequency components.

4. A control method for a moving image coding apparatus which codes time series frames constituting moving image data, comprising:
    a decomposition step of decomposing a current frame into a plurality of subbands having different frequency components;
    a first extraction step of, with a threshold set for each subband being represented by TB, extracting data of upper bits as motion compensation target data which excludes lower TB bits of frequency component coefficient data constituting each subband;
    a second extraction step of extracting data of lower TB bits of the frequency component coefficient data constituting each subband as non motion compensation target data;
    motion compensation means for generating motion vector information and predicted value information on the basis of motion compensation target data of a the current frame extracted in the first extraction step and decoded data corresponding to the motion compensation target data obtained when a preceding frame is coded;
    a first coding step of obtaining a difference value between predicted value information generated in the motion compensation step and the motion compensation target data in the current frame and coding the difference value and the motion vector information;
    a second coding step of encoding in units of bitplanes data of the lower TB bits of each frequency component coefficient data extracted in the second extraction step;
    a multiplexing step of multiplexing code data obtained in the first coding step and the second coding step; and
    a deciding step of detecting the code data amount of the current frame multiplexed by the multiplexing step and deciding a number of bitplanes not to be encoded for the subsequent frame,
    wherein the second coding step encodes bitplanes of data of the lower TB bits excluding the number of bitplanes, from a lowest bit plane, decided by said deciding step when the preceding frame had been encoded.

5. A non-transitory computer-readable storage medium storing a computer program which is read and executed by a computer to function as a moving image coding apparatus which codes time series frames constituting moving image data, wherein the computer program functions as:
- a decomposition unit that decomposes a current frame into a plurality of subbands having different frequency components;
- a first extraction unit that, with a threshold set for each subband being represented by TB, extracts data of upper bits as motion compensation target data which excludes lower TB bits of frequency component coefficient data constituting each subband;
- a second extraction unit that extracts data of lower TB bits of the frequency component coefficient data constituting each subband as non motion compensation target data;
- a motion compensation unit that generates motion vector information and predicted value information on the basis of motion compensation target data of a the current frame extracted by the first extraction unit and decoded data corresponding to the motion compensation target data obtained when a preceding frame is coded;
- a first coding unit that obtains a difference value between predicted value information generated by the motion compensation unit and the motion compensation target data in the current frame and coding the difference value and the motion vector information;
- a second coding unit that encodes, in units of bitplanes, data of the lower TB bits of each frequency component coefficient data extracted by the second extraction unit; and
- a multiplexing unit that multiplexes code data obtained by the first coding unit and the second coding unit; and
- a decision unit that detects the code data amount of the current frame multiplexed by said multiplexing unit and decides a number of bitplanes not to be encoded for the subsequent frame,
- wherein said second coding unit encodes bitplanes of data of the lower TB bits excluding the number of bitplanes, from a lowest bit plane, decided by said decision unit when the preceding frame had been encoded.

6. A moving image decoding apparatus which decodes moving image data coded by a moving image coding apparatus defined in claim 1, comprising:
- separation means for separating code data of an input frame into first code data corresponding to motion compensation target data and second code data corresponding to non motion compensation target data;
- first decoding means for generating decoded data of upper bits of each subband in a current frame on the basis of a difference value and motion vector information with respect to data of the upper bits of each subband in the current frame obtained by decoding the separated first code data and decoded data of motion compensation data in a preceding frame;
- second decoding means for decoding the second code data encoded by said second coding unit to decode the bitplanes of the data of the lower TB bits that exclude the number of bitplanes, from a lowest bit plane, decided by said decision unit, which detects the code data amount of the current frame multiplexed by said multiplexing unit and decides a number of bitplanes not to be encoded for the subsequent frame, when the preceding frame had been encoded, TB representing a threshold set for the extraction of data of each subband;
- generation means for generating frequency component data of each subband in the current frame by combining the decoded data of the lower bits of each subband obtained by said second decoding means and the decoded data of the upper bits of each subband obtained by said first decoding means; and
- reconstruction means for reconstructing an image of the current frame by performing processing inverse to said decomposition unit for the frequency component data of the subband generated by said generation means.

7. The moving image decoding apparatus according to claim 6, unit that counts a time period for decoding a current frame and sets a predetermined number of code data of bitplanes, of the second code data, which ranges from a lower bitplane to an upper bitplane as data other than data to be decoded for decoding a subsequent frame, in accordance with the counted time period.

8. The apparatus according to claim 7, wherein said setting means increases the number of bitplanes which are not to be decoded with respect to a subband in which frequency components gradually decrease in frequency, when a time required to reconstruct one preceding frame is measured, and a value of the measured time is larger than a first threshold, and decreases the number of bitplanes which are not to be decoded with respect to a subband in which frequency components gradually increase in frequency, when the value of the measured time is smaller than a second threshold.

9. A control method for the moving image decoding apparatus which decodes moving image data coded by a moving image coding method as set forth in claim 4, comprising the steps of:
- a separation step of separating code data of an input frame into first code data corresponding to motion compensation target data and second code data corresponding to non motion compensation target data;
- a first decoding step of generating decoded data of upper bits of each subband in a current frame on the basis of a difference value and motion vector information with respect to data of the upper bits of each subband in the current frame obtained by decoding the separated first code data and decoded data of motion compensation data in a preceding frame;
- a second decoding step of decoding the second code data encoded by said second coding step to decode the bitplanes of the data of the lower TB bits that exclude the number of bitplanes, from a lowest bit plane, decided by said decision step, which detects the code data amount of the current frame multiplexed by said multiplexing step and decides a number of bitplanes not to be encoded for the subsequent frame, when the preceding frame had been encoded, TB representing a threshold set for the extraction of data of each subband;
- a generation step of generating frequency component data of each subband in the current frame by combining the decoded data of the lower bits of each subband obtained in the second decoding step and the decoded data of the upper bits of each subband obtained in the first decoding step; and
- a reconstruction step of reconstructing an image of the current frame by performing processing inverse to the decomposition step for the frequency component data of the subband generated in the generation step.

10. A non-transitory computer-readable storage medium storing a computer program which is read and executed by a computer to function as a moving image decoding apparatus which decodes moving image data coded by a moving image coding apparatus as set forth in claim 1, wherein the computer program functions as:

separation means for separating code data of an input frame into first code data corresponding to motion compensation target data and second code data corresponding to non motion compensation target data;

first decoding means for generating decoded data of upper bits of each subband in a current frame on the basis of a difference value and motion vector information with respect to data of the upper bits of each subband in the current frame obtained by decoding the separated first code data and decoded data of motion compensation data in a preceding frame;

second decoding means for decoding the second code data encoded by said second coding unit to decode the bitplanes of the data of the lower TB bits that exclude the number of bitplanes, from a lowest bit plane, decided by said decision unit, which detects the code data amount of the current frame multiplexed by said multiplexing unit and decides a number of bitplanes not to be encoded for the subsequent frame, when the preceding frame had been encoded, TB representing a threshold set for the extraction of data of each subband;

generation means for generating frequency component data of each subband in the current frame by combining the decoded data of the lower bits of each subband obtained by the second decoding means and the decoded data of the upper bits of each subband obtained by the first decoding means; and reconstruction means for reconstructing an image of the current frame by performing processing inverse to the decomposition unit for the frequency component data of the subband generated by the generation means.

* * * * *